United States Patent
Hibino et al.

(10) Patent No.: US 8,305,619 B2
(45) Date of Patent: Nov. 6, 2012

(54) IMAGE PROCESSING DEVICE, IMAGE PROCESSING METHOD AND PROGRAM

(75) Inventors: Takeshi Hibino, Toyokawa (JP); Takatsugu Kuno, Hoi-gun (JP); Katsushi Sukigara, Hoi-gun (JP); Kenichi Sawada, Toyohashi (JP); Atsushi Tomita, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 296 days.

(21) Appl. No.: 12/629,378

(22) Filed: Dec. 2, 2009

(65) Prior Publication Data
US 2010/0134839 A1 Jun. 3, 2010

(30) Foreign Application Priority Data
Dec. 3, 2008 (JP) ................................. 2008-308264

(51) Int. Cl.
G06F 3/12 (2006.01)
G06K 15/00 (2006.01)
H04N 1/00 (2006.01)
H04N 1/40 (2006.01)

(52) U.S. Cl. ...... 358/1.15; 358/1.14; 358/400; 358/402; 358/440; 358/443

(58) Field of Classification Search .................. None
See application file for complete search history.

(56) References Cited

U.S. PATENT DOCUMENTS
2004/0239974 A1* 12/2004 Uchida et al. ................. 358/1.14
2005/0219640 A1* 10/2005 Kasatani ....................... 358/402
2008/0137152 A1* 6/2008 Oguri ............................. 358/440

(Continued)

FOREIGN PATENT DOCUMENTS
JP 04-316270 11/1992

(Continued)

OTHER PUBLICATIONS

Office Action (Decision of Refusal) dated Feb. 15, 2011, issued in the corresponding Japanese Patent Application No. 2008-308264, and an English Translation thereof.

(Continued)

Primary Examiner — Satwant Singh
(74) Attorney, Agent, or Firm — Buchanan Ingersoll & Rooney PC

(57) ABSTRACT

The present invention is intended to improve operability of an image processing device by reading a document with multiple pages at a time, changing a page addressed to each destination, and transmitting the page to each destination. In order to achieve this, an image processing device 1 for example comprises: a scanner unit 2 for reading a document with multiple pages and for generating image data; a destination setting part 52 for setting a plurality of destinations to which the image data generated by the scanner unit 2 are addressed; a transmission page setting part 53 for selecting at least one page addressed to each of the plurality of destinations from the multiple pages for which the image data are generated by the scanner unit 2, and for setting the selected page as a transmission page addressed to each destination; a file creation part 54 for creating a transmission file containing the image data of the selected page to be transmitted to each destination based on the transmission page set for each destination by the transmission page setting part 53; and a file transmission part 55 for individually transmitting the transmission file created by the file creation part 54 to each destination.

18 Claims, 20 Drawing Sheets

U.S. PATENT DOCUMENTS

2008/0309973 A1* 12/2008 Okamoto .................. 358/1.15

FOREIGN PATENT DOCUMENTS

| JP | 05-244376 | 9/1993 |
| --- | --- | --- |
| JP | 09-023325 | 1/1997 |
| JP | 10-191018 | 7/1998 |
| JP | 2003-108496 A | 4/2003 |
| JP | 2005-006209 | 1/2005 |
| JP | 2005-143039 A | 6/2005 |
| JP | 2006-180405 A | 7/2006 |
| JP | 2006-203632 A | 8/2006 |

OTHER PUBLICATIONS

Office Action dated Nov. 30, 2010, issued in the corresponding Japanese Patent Application No. 2008-308264, and an English Translation thereof.

* cited by examiner

Fig. 3

DESTINATION INFORMATION 44

| DESTINATION NAME | DESTINATION ADDRESS | SEPARATION AND TRANSMISSION SETTING | USER ATTRIBUTE |
|---|---|---|---|
| A | 192.128.10.1 | PATTERN 1 | MANAGER |
| B | 192.128.10.11 | PATTERN 2 | JOB AT THE GENERAL LEVEL |
| C | 192.128.11.5 | PATTERN 2 | JOB AT THE GENERAL LEVEL |
| D | 192.128.10.8 | PATTERN 1 | LEADER |

DESTINATION SETTING INFORMATION  15

| DESTINATION NAME | DESTINATION ADDRESS | SEPARATION INSTRUCTION | SPECIFIED PAGE |
|---|---|---|---|
| A | 192.128.10.1 | YES | 1 |
| B | 192.128.10.11 | YES | 1-2 |
| C | 192.128.11.5 | YES | 1-2 |
| D | 192.128.10.8 | NO | ALL |
| E | 192.128.10.21 | NO | ALL |

DESTINATION SETTING INFORMATION  15

| DESTINATION NAME (15a) | DESTINATION ADDRESS (15b) | SEPARATION FILE (15e) |
|---|---|---|
| A | 192.128.10.1 | FILE1, 4 |
| B | 192.128.10.11 | FILE3 |
| C | 192.128.11.5 | FILE1 |
| D | 192.128.10.8 | FILE2 |
| E | 192.128.10.21 | FILE5 |
| F | 192.128.10.23 | FILE5 |
| G | 192.128.10.24 | FILE1-5 |

IMAGE PROCESSING DEVICE, IMAGE PROCESSING METHOD AND PROGRAM

This application is based on the application No. 2008-308264 filed in Japan, the contents of which are hereby incorporated by reference.

BACKGROUND OF THE INVENTION

1. Field of the Invention

The present invention relates to an image processing device, an image processing method and a program for reading a document with multiple pages, and for transmitting image data to a plurality of destinations.

2. Description of the Background Art

An image processing device called such as a complex device or an MFP (multifunction peripheral) is capable of reading a document with multiple pages to generate image data, and transmitting the image data to a designated destination. In this case, there is a request for reading a document with multiple pages at a time, and changing a page addressed to each destination among pages of the document for each destination. As an example, for transmission of a document such as a technical material with multiple pages to a plurality of persons concerned, it may be requested to distribute only a first page including a summary and a conclusion to a person in a management position such as a leader or a manager, and all pages to a technical staff who is in a non-management position. In this case, according to an image processing device conventionally employed, a document reading operation for making transmission to a person in a management position, and a document reading operation for making transmission to a technical staff should be performed separately, resulting in poor operability.

According to a publicly known image processing device, after continuously reading a document has multiple pages, the read document is separated into a predetermined number of pages not smaller than two, and files of each of the separated pages are created. This image processing device is introduced for example in Japanese patent application laid-open No. 2005-143039. According to the technique disclosed therein, when a document has 20 pages is separated into "5 pages," for example, four files in total are created.

However, according to the technique disclosed in Japanese patent application laid-open No. 2005-143039 described above, several types of documents has the same number of pages are read at a time to create a file for each type of document. Therefore, when it is requested to change a page to be transmitted for each destination after a document has multiple pages is read, the number of pages according to which the document is to be separated should be changed for each destination. Thus, even in the technique disclosed in Japanese patent application laid-open No. 2005-143039, in order to change a page addressed to each destination, it is required to repeatedly perform a reading operation of the document with changing the number of pages according to which a document is to be separated. Namely, this technique does not help improving operability.

SUMMARY OF THE INVENTION

In order to improve operability in document reading, the present invention is intended to provide an image processing device, an image processing method, and a program capable of reading a document with multiple pages at a time, changing a page addressed to each destination, and transmitting the page to each destination.

First, the present invention is directed to an image processing device.

According to one aspect of this invention, the image processing device comprises: a document reading part for reading a document with multiple pages and for generating image data of each page; a destination setting part for setting a plurality of destinations to which the image data generated by the document reading part are addressed; a transmission page setting part for selecting at least one page addressed to each of the plurality of destinations from the multiple pages for which the image data are generated by the document reading part, and for setting the selected page as a transmission page addressed to each destination; a file creation part for creating a transmission file containing the image data of the selected page to be transmitted to each destination based on the transmission page set for each destination by the transmission page setting part; and a file transmission part for individually transmitting the transmission file created by the file creation part to each destination.

According to another aspect of this invention, when the file transmission part performs transmission to each destination, the file creation part preferably extracts the image data of at least one page addressed to each destination from the image data of the multiple pages generated by the document reading part to create the transmission file.

According to still another aspect of this invention, the transmission page setting part preferably sets the transmission page addressed to each destination before the document reading part starts to read the document with the multiple pages.

According to still another aspect of this invention, the image processing device preferably further comprises a page separation part for separating the multiple pages for which the image data are generated by the document reading part into a predetermined number of pages to create two or more files containing the image data of different pages. The transmission page setting part preferably associates at least one file selected from two or more files created by the page separation part with each of the plurality of destinations to set the transmission page addressed to each of the plurality of destinations.

According to still another aspect of this invention, the file creation part preferably creates the transmission file addressed to each destination based on at least one file associated with each of the plurality of destinations.

Second, the present invention is directed to an image processing method.

According to one aspect of this invention, the image processing method comprises the steps of: (a) reading a document with multiple pages and generating image data of each page; (b) setting a plurality of destinations to which the image data generated in the step (a) are addressed; (c) selecting at least one page addressed to each of the plurality of destinations from the multiple pages for which the image data are generated in the step (a), and setting the selected page as a transmission page addressed to each destination; (d) creating a transmission file containing the image data of the selected page to be transmitted to each destination based on the transmission page set for each destination in the step (c); and (e) individually transmitting the transmission file created in the step (d) to each destination.

According to another aspect of this invention, when transmission to each destination is performed in the step (e), the image data of at least one page addressed to each destination is preferably extracted from the image data of the multiple pages generated in the step (a) to create the transmission file in the step (d).

According to still another aspect of this invention, the transmission page addressed to each destination is preferably set in the step (c) before the document with the multiple pages is started to be read in the step (a).

According to still another aspect of this invention, the image processing method preferably further comprising the step of: (f) separating the multiple pages for which the image data are generated in the step (a) into a predetermined number of pages to create two or more files containing the image data of different pages. In the step (c), at least one file selected from two or more files created in the step (f) is associated with each of the plurality of destinations to set the transmission page addressed to each of the plurality of destinations.

According to still another aspect of this invention, the transmission file addressed to each destination is preferably created based on at least one file associated with each of the plurality of destinations in the step (d).

Third, the present invention is directed to a program stored on a computer readable medium and executed by a computer of an image processing device.

According to one aspect of this invention, the program causes the computer to execute processing comprising the steps of: (a) reading a document with multiple pages and generating image data of each page; (b) setting a plurality of destinations to which the image data generated in the step (a) are addressed; (c) selecting at least one page addressed to each of the plurality of destinations from the multiple pages for which the image data are generated in the step (a), and setting the selected page as a transmission page addressed to each destination; (d) creating a transmission file containing the image data of the selected page to be transmitted to each destination based on the transmission page set for each destination in the step (c); and (e) individually transmitting the transmission file created in the step (d) to each destination.

According to another aspect of this invention, when transmission to each destination is performed in the step (e), the image data of at least one page addressed to each destination is preferably extracted from the image data of the multiple pages generated in the step (a) to create the transmission file in the step (d).

According to still another aspect of this invention, the transmission page addressed to each destination is preferably set in the step (c) before the document with the multiple pages is started to be read in the step (a).

According to still another aspect of this invention, the program preferably causes the computer to further execute processing comprising the step of: (f) separating the multiple pages for which the image data are generated in the step (a) into a predetermined number of pages to create two or more files containing the image data of different pages. In the step (c), at least one file selected from two or more files created in the step (f) is associated with each of the plurality of destinations to set the transmission page addressed to each of the plurality of destinations.

According to still another aspect of this invention, the transmission file addressed to each destination is preferably created based on at least one file associated with each of the plurality of destinations in the step (d).

BRIEF DESCRIPTION OF THE DRAWINGS

FIG. 3 is an example of destination information;

FIG. 10 shows an example of destination setting information;

FIG. 19 shows an example of the destination setting information updated by the separation file selection.

DESCRIPTION OF THE PREFERRED EMBODIMENTS

Figure 1:
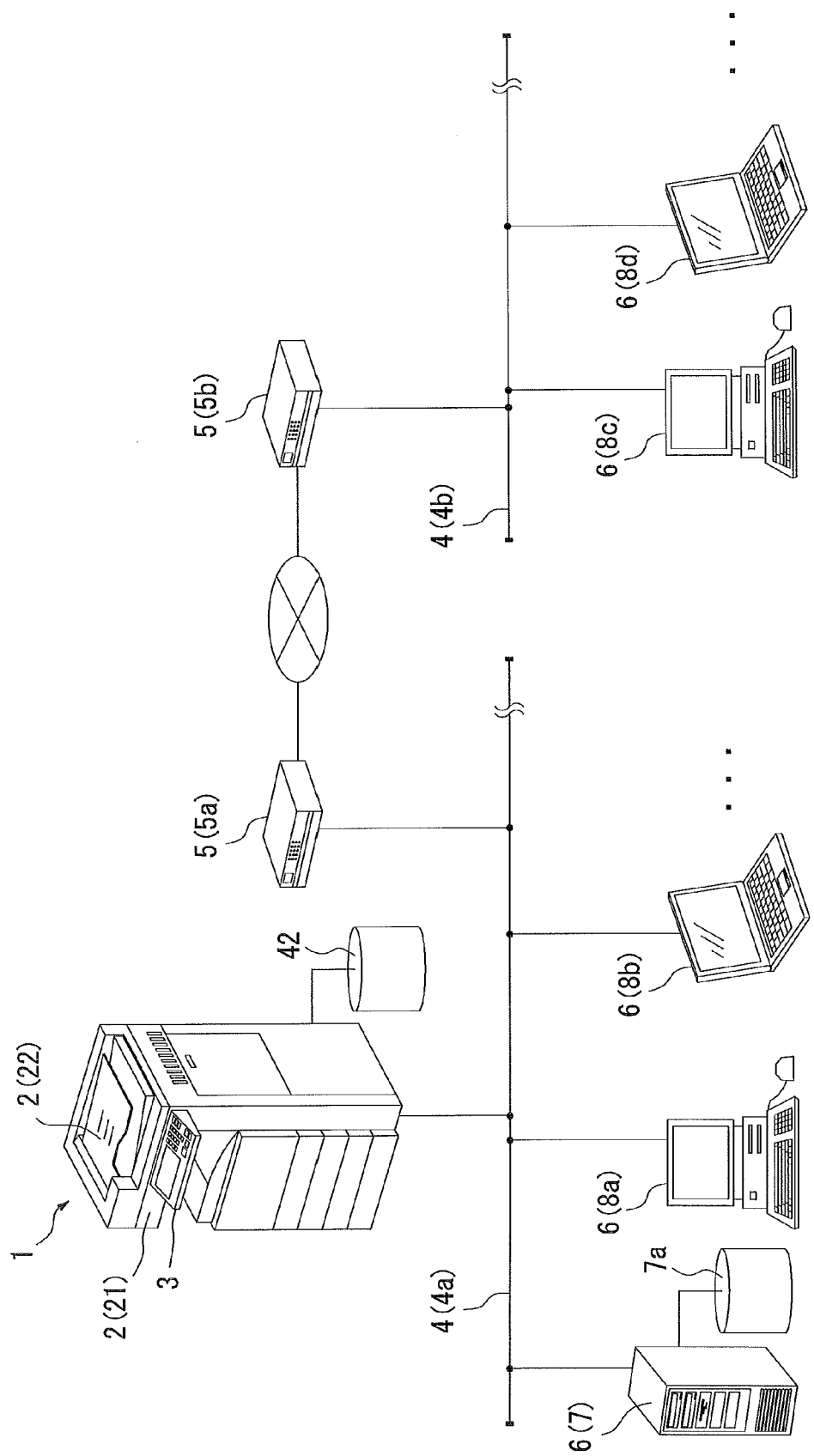
FIG. 1 shows an exemplary configuration of an image processing system including an image processing device.

Preferred embodiments of the present invention are described in detail below with reference to figures. In the description given below, those elements which are shared in common among the preferred embodiments are represented by the same reference numerals, and these elements are not discussed repeatedly for the same description.

First Preferred Embodiment

FIG. 1 shows an exemplary configuration of an image processing system including an image processing device to which the present invention is applied. The image processing system is constituted by connecting an image processing device 1 and a plurality of computers 6 with each other through a network 4. In the example of FIG. 1, the image processing device 1 is illustrated as what is called an MFP (multifunction peripheral) having several functions such as a copier function, a scan function, a FAX function, a printer function, and others. Alternatively, the image processing device 1 may be a scan-only device, or a FAX-only device.

The image processing device 1 includes a scanner unit 2 for reading a document. The scanner unit 2 has a document reading unit 21 for reading a document to generate image data, and an automatic document feeder 22 arranged at the upper part of the document reading unit 21, and which feeds multiple pages of a document placed thereon one by one to the document reading unit 21. The document reading unit 21 and the automatic document feeder 22 operate in synchronization with each other. As a result, while the automatic document feeder 22 feeds multiple pages of a document one by one to the document reading unit 21, the document reading unit 21 reads images from the document being fed. This enables to continuously reading a document with multiple pages automatically.

The image processing device 1 can create a file of image data generated by reading a document, and transmit the file thereby created to each of the plurality of computers 6 through the network 4. In this case, the image processing device 1 may transmit the file not only to the computers 6 connected to an internal network 4a to which the image processing device 1 is directly connected, but also to the computers 6 connected to an external network 4b to which the image processing device 1 is connected via routers 5 (5a, 5b). The plurality of computers 6 are constituted by a server computer 7 connected to the network 4, and client computers 8a, 8b, 8c, 8d, and others assigned to individual users.

The image processing device 1 has an operation panel 3 on the front side of the main body of itself for a user to perform operations. When a document has multiple pages is read and transmitted to a plurality of destinations, for example, a user operates the operation panel 3 to make various settings. As an example, when transmission files addressed to respective users of the client computers 8a, 8b, 8c, 8d and others are transmitted to each of the client computers 8a, 8b, 8c, 8d and others, a user operates the operation panel 3 to designate respective destinations allocated to each of the client computers 8a, 8b, 8c, 8d and others. Then, the image processing device 1 transmits transmission files to each of the client computer corresponding to the destinations designated by the user. However transmission files may be transmitted in an alternative way. As an example, when there are folders of each user in a hard disk drive 7a of the server computer 7, a transmission file addressed to each user may be output to a corresponding folder. A hard disk drive 42 may also be set to the image processing device 1 either externally or internally. When folders of each user are established in the hard disk drive 42, a transmission file addressed to each user may be output to a corresponding folder.

Figure 2:
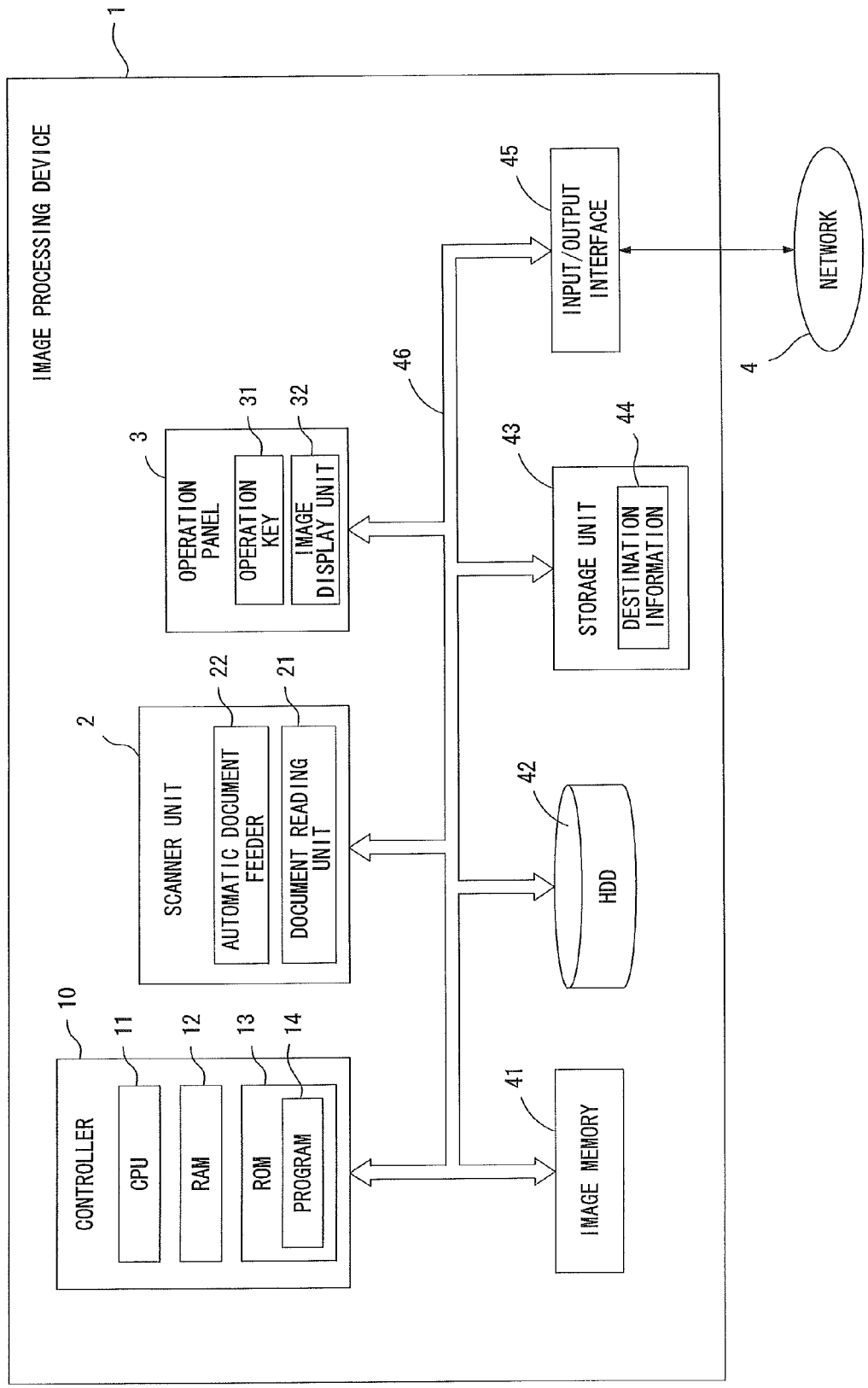
FIG. 2 is a block diagram showing an exemplary internal structure of the image processing device.

FIG. 2 is a block diagram showing an exemplary internal structure of the image processing device 1. The image processing device 1 includes a controller 10, a scanner unit 2, the operation panel 3, an image memory 41, the hard disk drive 42, a storage unit 43, and an input/output interface 45. These components are connected to each other through a data bus 46 so as to realize data communication between these components. The network 4 is connected to the input/output interface 45.

The controller 10 controls the overall operation of the image processing device 1. The controller 10 has a CPU 11, a RAM 12, and a ROM 13 in which a program 14 is stored in advance. The CPU 11 is a processing unit (computer) which executes various processing described later by reading the program 14 stored in the ROM 13 and executing the program 14. The RAM 12 is a storage part for temporarily storing therein information such as that used by the CPU 11 to execute the various processing.

The operation panel 3 has an operation key 31 which is operable for a user, and an image display unit 32 which displays various types of information for the user. The operation key 31 is formed by touch panel keys arranged on a surface of the image display unit 32, and push-button keys arranged around the image display unit 32. The display screen of the image display unit 32 is controlled by the controller 10. When a user operates the operation key 31, the operation panel 3 outputs a key signal based on the user's key operation to the controller 10.

The image memory 41 stores therein image data to be output generated by reading a document by the document reading unit 21 of the scanner unit 2. When the document reading unit 21 of the scanner unit 2 continuously and automatically reads a document with multiple pages, the image data of each page is output from the document reading unit 21 one by one. So, the image data of the multiple pages are sequentially stored one by one into the image memory 41 each time the image data of one page is output from the document reading unit 21.

As described above, the hard disk drive 42 has either an external or an internal type. In the example shown in FIG. 2, the hard disk drive 42 is built into the image processing device 1. Thus, when a folder of each user established in the hard disk drive 42 is designated as a destination of a transmission file addressed to a corresponding user, transmission of the transmission file is executed internally of the image processing device 1.

The storage unit 43 is constituted for example by a non-volatile memory, and stores therein a destination information 44 and the like registered in advance in the image processing device 1. The destination information 44 contains a plurality of destinations to which the image processing device 1 can transmit files. Namely, the destination information 44 contains information for designating destinations such as folders of respective users established in the hard disk drive 7a of the server computer 7, or folders of respective users established in the hard disk drive 42 built into the image processing device 1, besides information for designating destinations of the plurality of computers 6 connected to the network 4.

FIG. 3 is an example of the destination information 44. The destination information 44 contains a destination name 44a provided for each destination, a destination address 44b to which a transmission file addressed to each destination is transmitted, a separation and transmission setting 44c set as a default value for each destination, and a user attribute 44d containing information relating to a user of each destination.

Here, in the image processing device 1, a plurality of destinations is selected to which a document with multiple pages after being read is addressed. In this case, the document with the multiple pages is separated and transmission pages extracted based on patterns defined in advance in the separation and transmission setting 44c are transmitted to the plurality of selected destinations. One pattern selected from two or more patterns is set in advance for each destination. In the example of FIG. 3, Pattern 1 is set for the separation and transmission setting 44c of each destination "A" and "D." Pattern 2 is set for the separation and transmission setting 44c of each destination "B" and "C." In a first preferred embodiment of the present invention, a pattern that can be set for each destination as for the separation and transmission setting 44c includes Pattern 1 and Pattern 2. According to Pattern 1, when a document with multiple pages is read in the image processing device 1, only a first page is extracted as a transmission page, for example. According to Pattern 2, when a document with multiple pages is read in the image processing device 1, all read pages are extracted as transmission pages, for example. The separation and transmission setting 44c is a default value applied when a destination corresponding to a pattern set by the separation and transmission setting 44c is selected as a targeted destination of a transmission file. A user may select a destination and change its default value set in the separation and transmission setting 44c thereafter, thereby freely determining a transmission page addressed to the selected destination.

The user attribute 44d contains an attribute such as a title of position corresponding to a user of each destination, for example. When a new destination is to be registered into the image processing device 1, for example, three kinds of information containing the destination name 44a, the destination address 44b and the user attribute 44d are entered as new information for the destination information 44. Then, a pattern of the separation and transmission setting 44c can automatically be set based on the value of the user attribute 44d. By way of example, when a management position such as a leader or a manager is set as the user attribute 44d, Pattern 1 for extracting only a first page as a transmission page is automatically set for the corresponding separation and transmission setting 44c. When a non-management position such as a job at the general level is set as the user attribute 44d, it is able to automatically set Pattern 2 for extracting all pages as transmission pages is automatically set for the corresponding separation and transmission setting 44c.

Figure 4A:
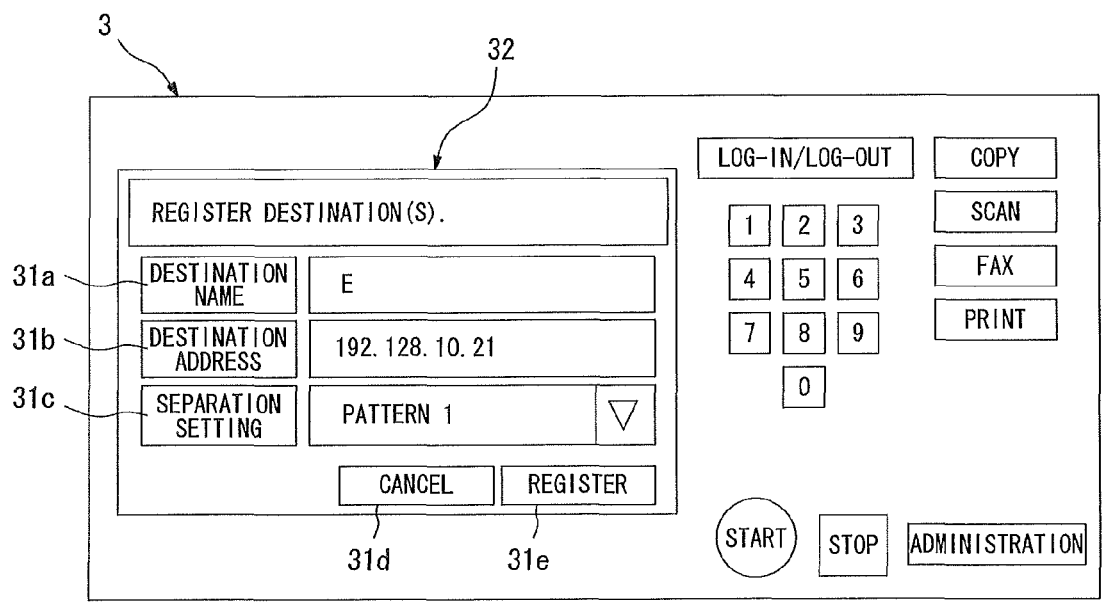
FIGS. 4A and 4B show exemplary registration screens displayed on an operation panel when the destination information is registered into the image processing device.
Figure 4B:
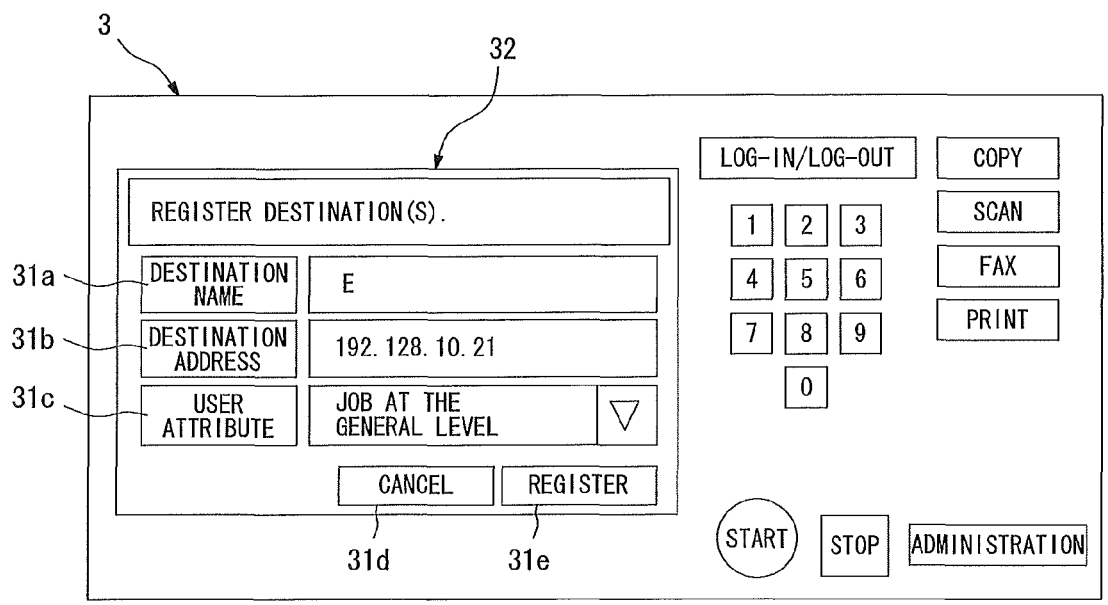

FIGS. 4A and 4B show exemplary registration screens displayed on the operation panel 3 when the destination information 44 is registered into the image processing device 1. The registration screen shown in FIG. 4A is displayed when the separation and transmission setting 44c is set by directly entering a pattern. In this case, items for entering the destination name 44a, the destination address 44b, and the separation and transmission setting 44c are displayed on the image display unit 32 of the operation panel 3. A user who registers a new destination enters a new destination name with operating operation keys 31a for destination name, and a new address corresponding to the destination with operating operation keys 31b for destination address, and selects one of a pattern from two or more patterns with operating operation keys 31c for separation setting. Then, the new entered destination is added to the destination information 44 stored in the storage unit 43 by operating a registration key 31e. When the user completes the processing without registering the new destination, the user operates a cancel key 31d.

The registration screen shown in FIG. 4B is displayed when the separation and transmission setting 44c is automatically set by entering the user attribute 44d. In this case, items for entering the destination name 44a, the destination address 44b, and the user attribute 44d are displayed on the image display unit 32 of the operation panel 3. A user who registers a new destination enters a new destination name with operating the operation keys 31a for destination name and a new address corresponding to the destination with operating the operation keys 31b for destination address, and selects a title of position of a user corresponding to the destination from two or more titles with operating the operation keys 31c for a user attribute. Then, a new destination is added to the destination information 44 stored in the storage unit 43 by operating the registration key 31e. Regarding the separation and transmission setting 44c, a pattern is automatically selected from two or more patterns based on the entered user attribute 44d, and the selected pattern is registered into the destination information 44. In this case, when the user completes the processing without registering the new destination, the user operates the cancel key 31d.

Figure 5:
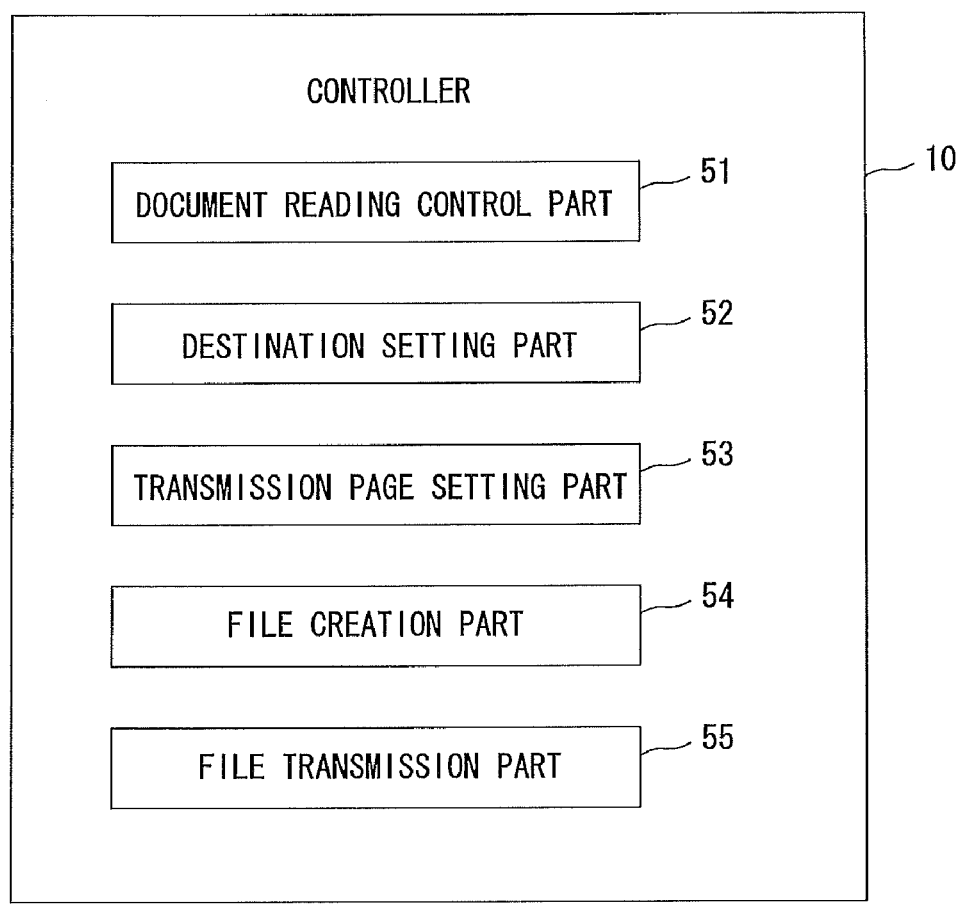
FIG. 5 shows the functional structure of a controller realized by executing a program in a first preferred embodiment of the present invention.

The image processing device 1 of the first preferred embodiment reads a document has multiple pages at a time with a plurality of destinations are designated. The image processing device 1 then creates transmission files by changing pages addressed to each destination that are selected from image data generated by reading the document. Further, the created transmission file is transmitted to each destination. As a result, the image data of a different page is transmitted to each destination. At this time, the CPU 11 executes the program 14 in the controller 10 so that the controller 10 functions as a document reading control part 51, a destination setting part 52, a transmission page setting part 53, a file creation part 54, and a file transmission part 55 as shown in FIG. 5.

The document reading control part 51 controls the document reading unit 21 and the automatic document feeder 22 of the scanner unit 2 to realize continuous reading of a document with multiple pages, thereby storing the image data of each page output from the document reading unit 21 one by one into the image memory 41.

The destination setting part 52 sets a plurality of destinations to which the image data of multiple pages stored in the image memory 41 are addressed in response to user's destination selection performed on the operation panel 3.

The transmission page setting part 53 selects a page addressed to each of a plurality of destinations from multiple pages for which image data stored in the image memory 41 are generated, and sets the selected page as a transmission page addressed to each of a plurality of destinations. In the first preferred embodiment, a user is allowed to freely specify a transmission page addressed to each destination when the user selects a plurality of destinations with the operation panel 3. The transmission page setting part 53 associates a transmission page specified by a user with each destination in response to user's transmission page specification made through the operation panel 3, thereby setting the transmission page.

The file creation part 54 creates a transmission file containing the image data of at least one page addressed to each destination based on a transmission page set for each destination by the transmission page setting part 53. In the first preferred embodiment, the image data of at least one page addressed to each destination is extracted from the image data of multiple pages stored in the image memory 41, and then a transmission file is created based on the setting of a transmission page addressed to each destination.

The file transmission part 55 individually transmits a transmission file addressed to each destination created by the file creation part 54 to a corresponding destination. When the client computers 8a, 8b, 8c, 8d on the network 4 are designated as destinations, the file transmission part 55 individually transmits a transmission file to each of the client computers 8a, 8b, 8c, 8d. When the server computer 7 is designated as a destination, the file transmission part 55 individually transmits a transmission file to the server computer 7. When a folder in hard disk drive 42 is designated as a destination, the file transmission part 55 individually transmits a transmission file to the designated folder in the hard disk drive 42 built in the image processing device 1.

Figure 6:
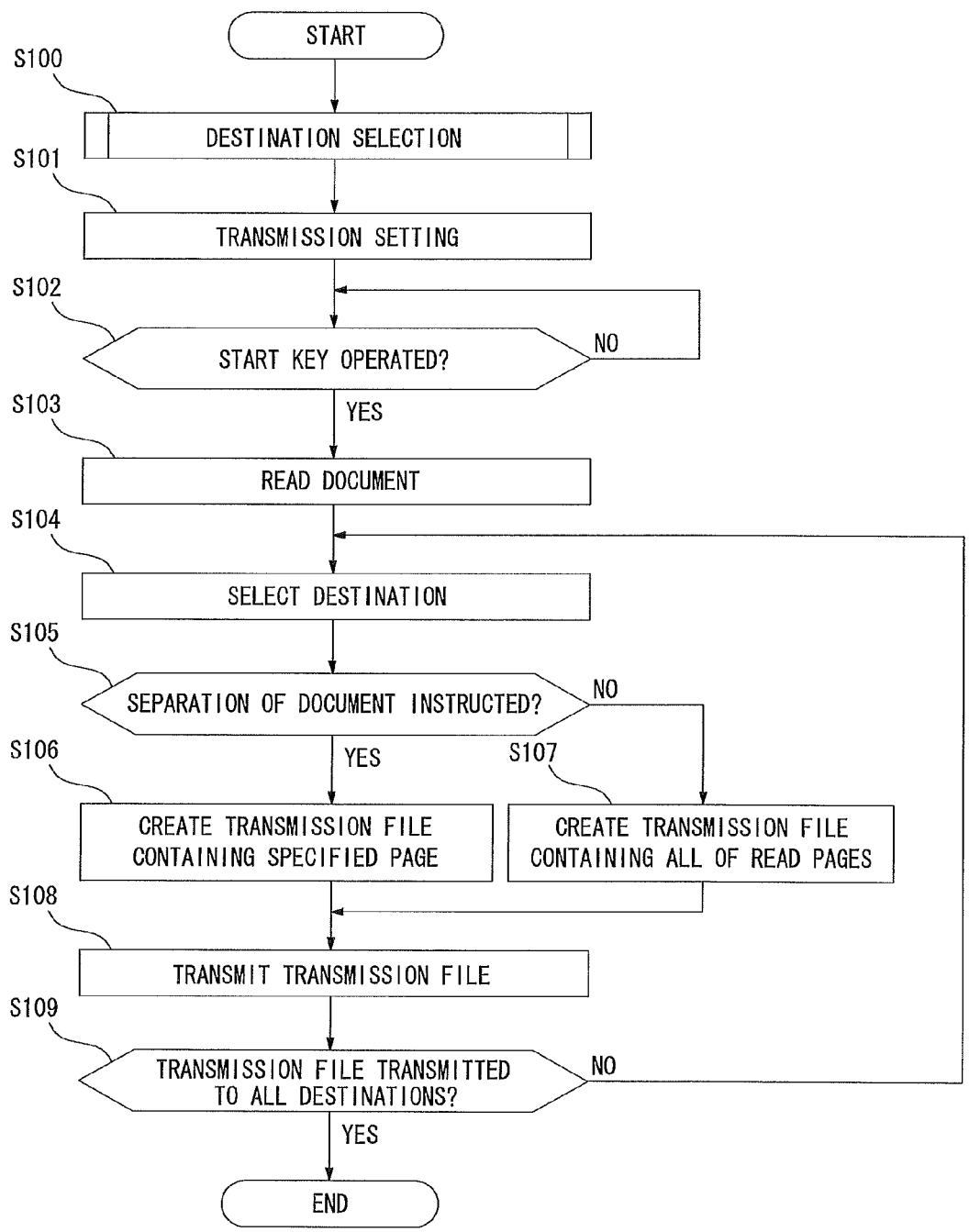
FIG. 6 is a flow diagram for explaining an exemplary process in the first preferred embodiment for the image processing device to read a document with multiple pages, and to transmit transmission files containing the image data of different pages to a plurality of destinations.
Figure 7:
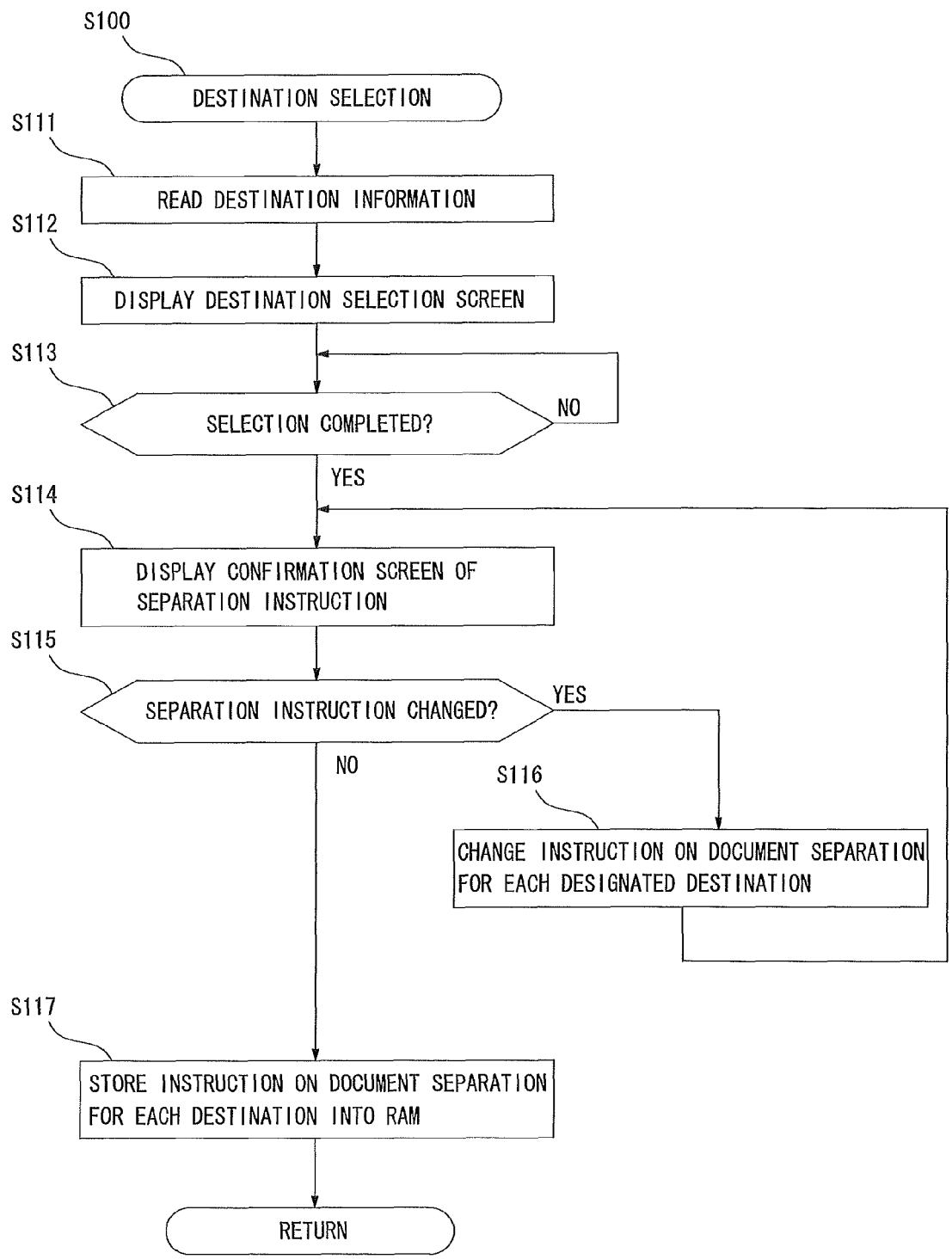
FIG. 7 is a flow diagram for explaining an exemplary detailed process of destination selection referred to in FIG. 6.

FIG. 6 and FIG. 7 are flow diagrams for explaining an exemplary process for the image processing device 1 to read a document with multiple pages, and to transmit transmission files containing the image data of different pages to a plurality of destinations. This process is performed by executing the program 14 by the CPU 11 in the controller 10 of the image processing device 1. When the controller 10 starts the process, destinations are selected first (step S100). The destination selection process is explained in detail in the flow diagram shown in FIG. 7. In the destination selection process, the controller 10 first becomes operative to function as the destination setting part 52. Then, the destination information 44 is read from the storage unit 43 (step S111), and a destination selection screen is displayed on the image display unit 32 of the operation panel 3 (step S112).

Figure 8:
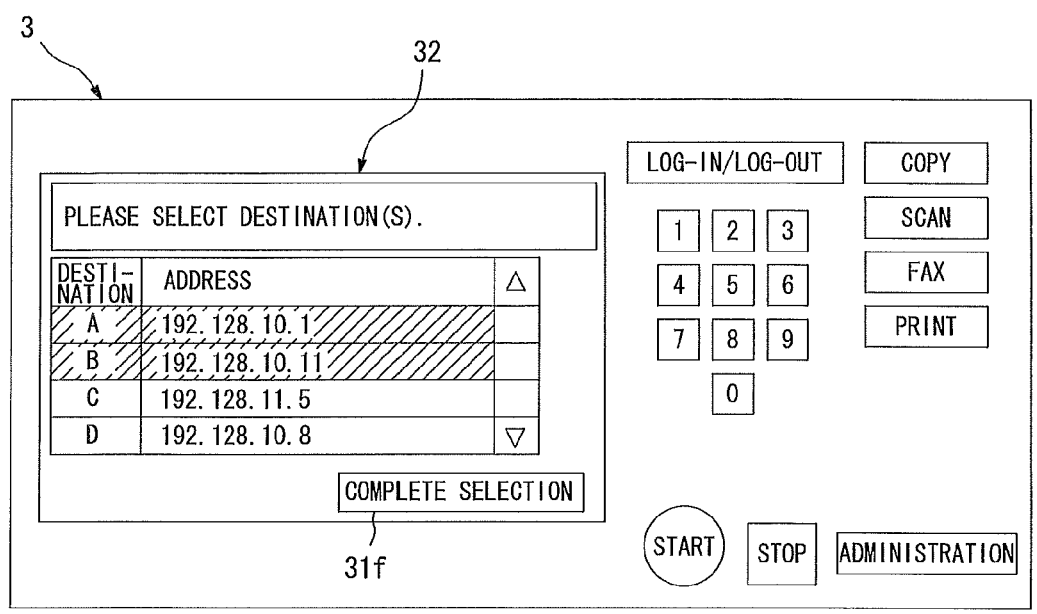
FIG. 8 shows a destination selection screen displayed on an image display unit of the operation panel.

FIG. 8 shows the destination selection screen displayed on the image display unit 32 of the operation panel 3. As shown in FIG. 8, the destination selection screen shows a list of destinations based on the destination information 44 registered in advance in the image processing device 1. This list can be scrolled up and down. So, a user can select a destination several times, thereby designating a plurality of destinations to which at least one page of a read document with multiple pages is addressed. In the example of FIG. 8, the destinations "A" and "B" are shown to be selected. After completing the selection of the plurality of destinations, the user operates an operation key 31f for completing selection.

The controller 10 checks to see whether or not the operation key 31f for completing selection was operated (step S113). If the operation key 31f is operated (if a result of step S113 is YES), the controller 10 stores destination setting information relating to the plurality of destinations selected by the user into the RAM 12, and then moves on to a next step. The controller 10 thereafter becomes operative to function as the transmission page setting part 53 to read the separation and transmission setting 44c of the destination information 44 set for each of the plurality of destinations selected by the user. Thereafter the controller 10 displays a confirmation screen of separation instruction on the image display unit 32 of the operation panel 3 (step S114).

Figure 9A:
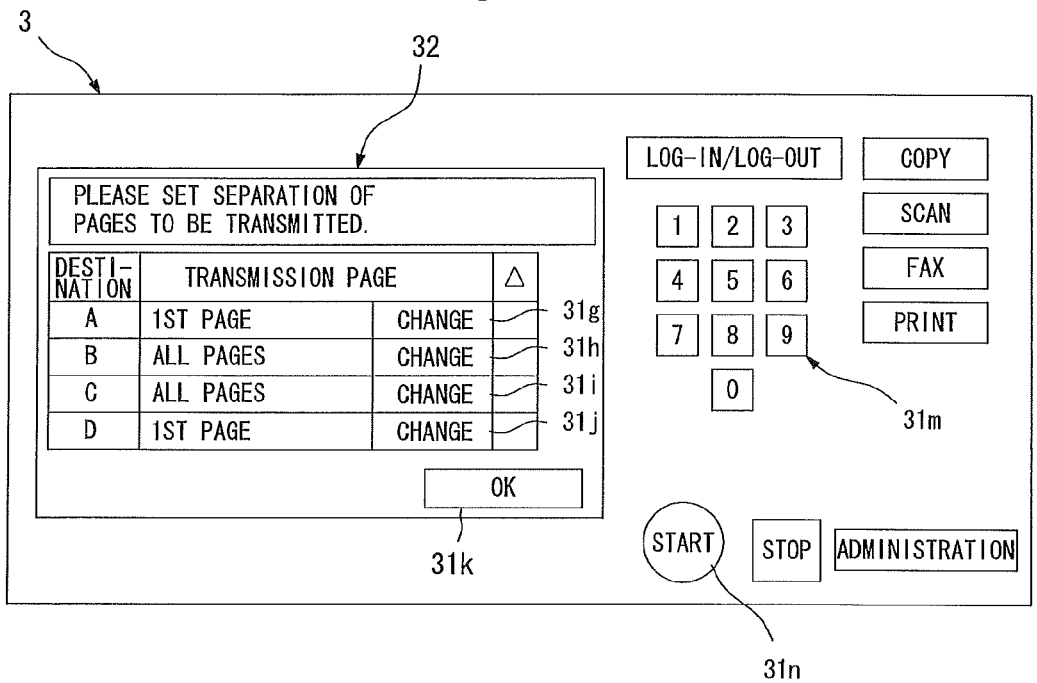
FIGS. 9A and 9B show separation instruction confirmation screens displayed on the image display unit of the operation panel.
Figure 9B:
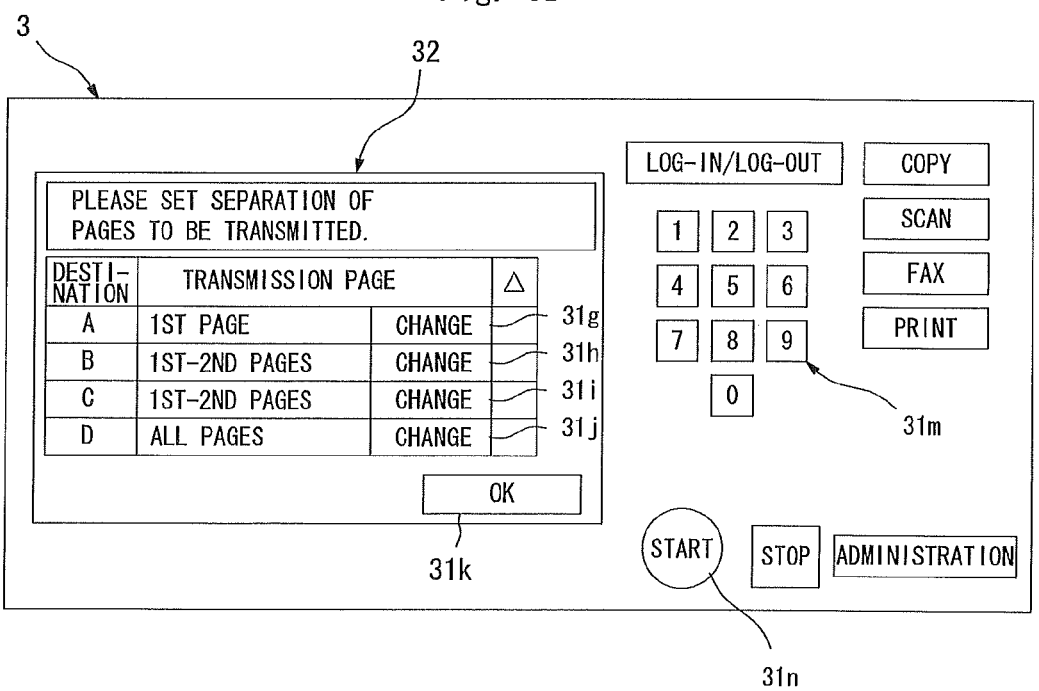

FIGS. 9A and 9B show confirmation screens of separation instruction displayed on the image display unit 32 of the operation panel 3. In the confirmation screen of separation instruction shown in FIG. 9A, a transmission page addressed to each destination is shown according to the pattern of the separation and transmission setting 44c set for each of the plurality of destinations. In the confirmation screen of separation instruction shown in FIG. 9B, a transmission page addressed to each destination after being changed by the user is shown. By way of example, when the user selects destinations "A", "B", "C", "D" as the plurality of destinations, transmission pages are set according to the patterns of the separation and transmission setting 44c stored in the destination information 44 (see FIG. 3) in the initial state of the confirmation screen of separation instruction as shown in FIG. 9A. In the example of FIG. 9A, transmission pages are set so that only a first page is addressed to the destination "A," all pages are addressed to the destinations "B" and "C," and only the first page is addressed to the destination "D." In order to change a transmission page addressed to each destination while checking the initial screen, the user operates change keys 31g, 31h, 31i or 31j corresponding to each destination to change the settings of transmission pages. The setting of transmission pages may be changed by for instance, operating a numeric keypad 31m and others of the operational panel 3 by the user. After the user changes the setting of a transmission page addressed to each destination, the confirmation screen of separation instruction is updated to the exemplary one shown in FIG. 9B. In the example of FIG. 9B, the settings of transmission pages are changed so that only the first page is addressed to the destination "A," first and second pages are addressed to the destinations "B" and "C," and all pages are addressed to the destination "D." When the user completes specifying a transmission page addressed to each of the plurality of destinations, he or she operates an OK key 31k.

After displaying the confirmation screen of separation instruction on the image display unit 32 of the operation panel 3 in step S114, the controller 10 is placed in a standby state until receiving a key signal from the operation panel 3. When a key signal is received, the controller 10 determines whether or not the user operated the change keys 31g, 31h, 31i or 31j (step S115). When the controller 10 determines that the user changed the setting of a transmission page addressed to each destination, the controller 10 moves on to step S116 to change an instruction on document separation for each designated destination. As a result, pages into which the document has the multiple pages is separated are changed to those specified by the user, and a transmission page addressed to the designated destination is set. After the setting of a transmission page is changed in step S116, the process flow returns to step S114 to update the display screen on the image display unit 32. Thereafter the process from steps S114 to S116 is repeated so that the confirmation screen of separation instruction on the operation panel 3 is changed from the one shown in FIG. 9 to the one shown in FIG. 9B.

When the user operates the OK key 31k on the confirmation screen of separation instruction, the controller 10 determines a result of step S115 as NO. The controller 10 thereafter additionally stores the instruction on document separation (setting of a transmission page) of each destination into the destination setting information relating to the plurality of destinations stored in the RAM 12 (step S117). FIG. 10 shows an example of destination setting information 15 stored in the RAM 12. The destination setting information 15 is stored into the RAM 12 by the execution of the destination selection process described above (step S100). The destination setting information 15 contains information relating to the plurality of destinations selected by the user. The destination setting information 15 contains a destination name 15a, a destination address 15b of each destination, a separation instruction 15c indicating whether or not the document has the multiple pages should be separated when the document is transmitted to each destination, and a specified page 15d specifying a page addressed to each destination when the document is to be transmitted after being separated. So, by referring to the destination setting information 15, targeted destinations are identified. Further, when a document is to be transmitted to each destination, the necessity of separating the document and extracting a specified transmission page can instantaneously be determined. The destination selection process is completed here, and the flow returns to the process shown in the flow diagram of FIG. 6.

Next, the controller 10 executes a transmission setting (step S101). In this processing, various settings are made such as setting of a file format in which for transmitting to a plurality of destinations when a document with multiple pages is read. After the transmission setting is completed, the controller 10 is placed in a standby state until a START key 31n of the operation panel 3 (see FIG. 9) is operated (step S102). When the START key 31n is touched, the controller 10 reads the document with the multiple pages placed on the scanner part 2 (step S103). At this time, the controller 10 becomes operative to function as the document reading control part 51 to control the operation of the scanner part 2. Then, the image data of the document with the multiple pages are entered into the image memory 41 on a page by page basis.

After reading of all the multiple pages of the document is completed, the controller 10 becomes operative to function as the file creation part 54 and the file transmission part 55. Then, the controller 10 reads the destination setting information 15 stored in the RAM 12, and selects a destination from the plurality of destinations selected by the user (step S104). Next, the controller 10 refers to the separation instruction 15c corresponding to the selected destination to check whether or not a separation of the document is instructed for the selected destination (step S105). When the separation of the document is instructed, the controller 10 refers to the specified page 15d of the destination setting information 15 to create a transmission file containing a specified page (step S106). More specifically, the controller 10 extracts the image data of every page specified by the specified page 15d of the destination setting information 15 from the image data of the multiple pages stored in the image memory 41, and then creates one transmission file. When the separation of the document is not instructed, the controller 10 creates a transmission file containing the image data of all of the multiple pages stored in the image memory 41 (step S107).

The controller 10 thereafter transmits the transmission file created in step S106 or S107 to the destination selected in step S104 (step S108). Next, the controller 10 determines whether or not transmission files were transmitted to all of the plurality of destinations registered in the destination setting information 15 (step S109). If there is a destination that has yet to be transmitted a transmission file, the process flow returns to step S104 to repeat the above-described process from step S104 to step S108. When transmissions to all of the destinations are completed, the process completes here.

Figure 11:
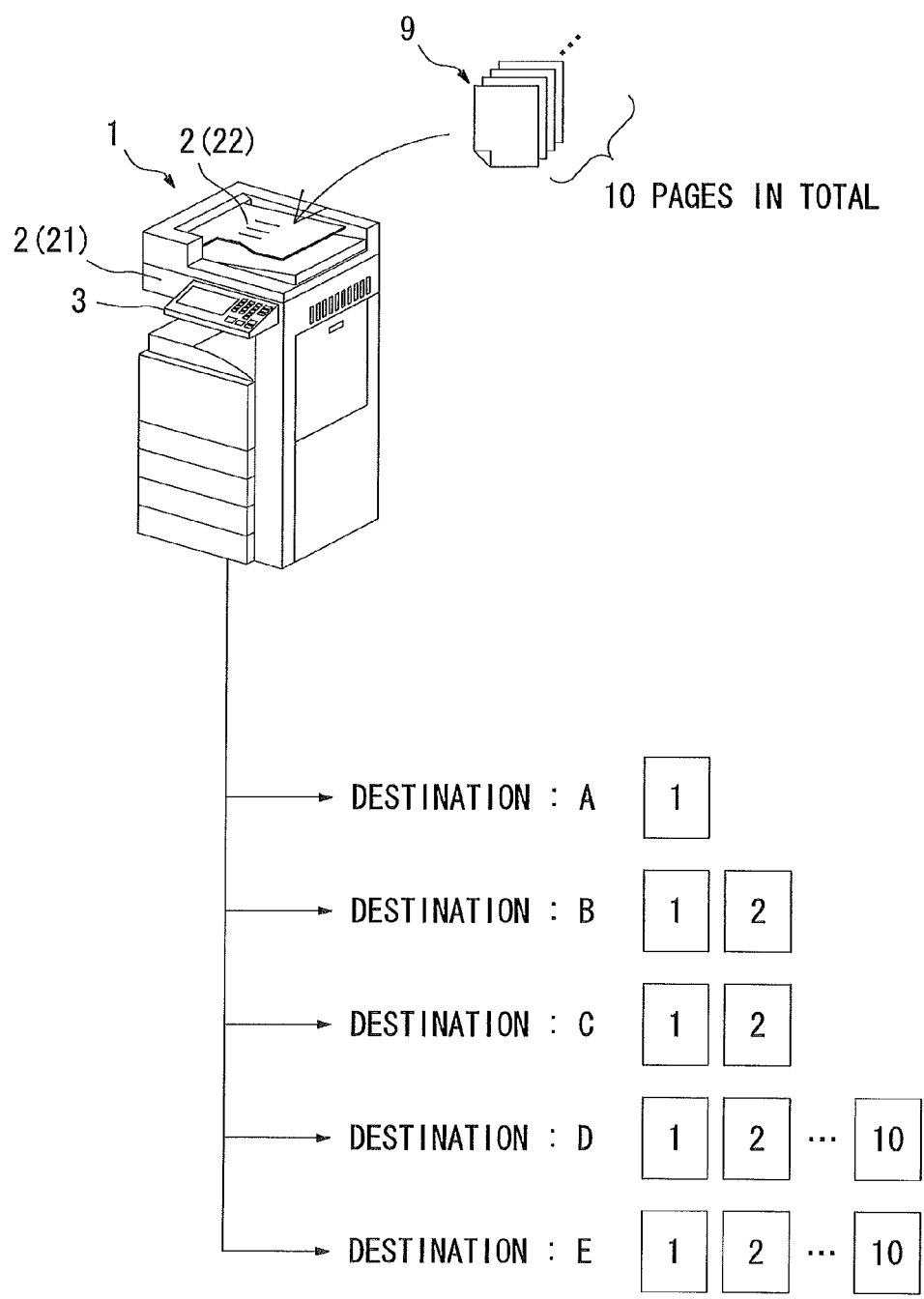
FIG. 11 shows exemplary transmission realized in the image processing device of the first preferred embodiment.

FIG. 11 shows an exemplary transmission realized in the image processing device 1 by performing the process described above. In the example shown in FIG. 11, the image processing device 1 reads a document 9 with 10 pages in total at a time. Then, a transmission file containing a transmission page specified by a user is transmitted to each of a plurality of destinations "A", "B", "C", "D" and "E" designated by the user. As a result, the image data of only a first page is transmitted to the destination "A," the image data of first and second pages are transmitted to the destinations "B" and "C," and the image data of all pages are transmitted to the destinations "D" and "E."

According to the configuration of the first preferred embodiment, a document with multiple pages is read, at least one page addressed to each of a plurality of destinations is selected from the multiple pages for which image data are generated, and the selected page is set as a transmission page addressed to each destination. Then, a transmission file containing the image data of at least one page addressed to each destination is created based on the transmission page thereby set for each destination. So, when the file transmission part 55 individually transmits a transmission file created for each destination, a transmission file containing the image data of a different page is transmitted to each destination. Thus, when a document with multiple pages is read by one reading operation and the document is transmitted to a plurality of destinations, one or more pages to be transmitted can be changed for each destination. This eliminates the need for repeating a document reading operation for every destination which requires being transmitted different pages, thereby improving operability.

As discussed, the image processing device 1 of the first preferred embodiment reads the document 9 with multiple pages all at a time, and changes a page configuration addressed to each of a plurality of destinations among the destinations. It is assumed that distributing such as a technical material with multiple pages to a plurality of persons concerned is requested, that only a first page including a summary and a conclusion is required to be addressed to a person in a management position such as a leader or a manager, and that all pages are required to be addressed to person in non-management position such as a technical staff. In this case, in the first preferred embodiment, a document reading operation is required to be performed only once to transmit the material to a person in each position appropriately. Namely, the image processing device 1 of the first preferred embodiment does not require a document reading operation to be performed separately for destinations among which need to be transmitted different pages. As a result, operability in transmitting different pages to a plurality of destinations is improved.

In the example described above, a case of transmitting one transmission file containing a transmission page specified by a user to each destination is explained. Alternatively, for instance, while one transmission file containing a transmission page specified by a user is transmitted to a destination, another transmission file containing the rest of the pages not specified by the user may also be transmitted to the same destination.

Second Preferred Embodiment

Next, a second preferred embodiment of the present invention is described. In the second preferred embodiment, image data generated by reading a document with multiple pages is separated into a predetermined number of pages to create two or more separation files. For transmission to a plurality of destinations, at least one file to be transmitted is selected from the two or more separation files to create a transmission file for each destination. In the second preferred embodiment, the configurations of the image processing system and the image processing device 1 are the same as those described in the first preferred embodiment.

Figure 12:
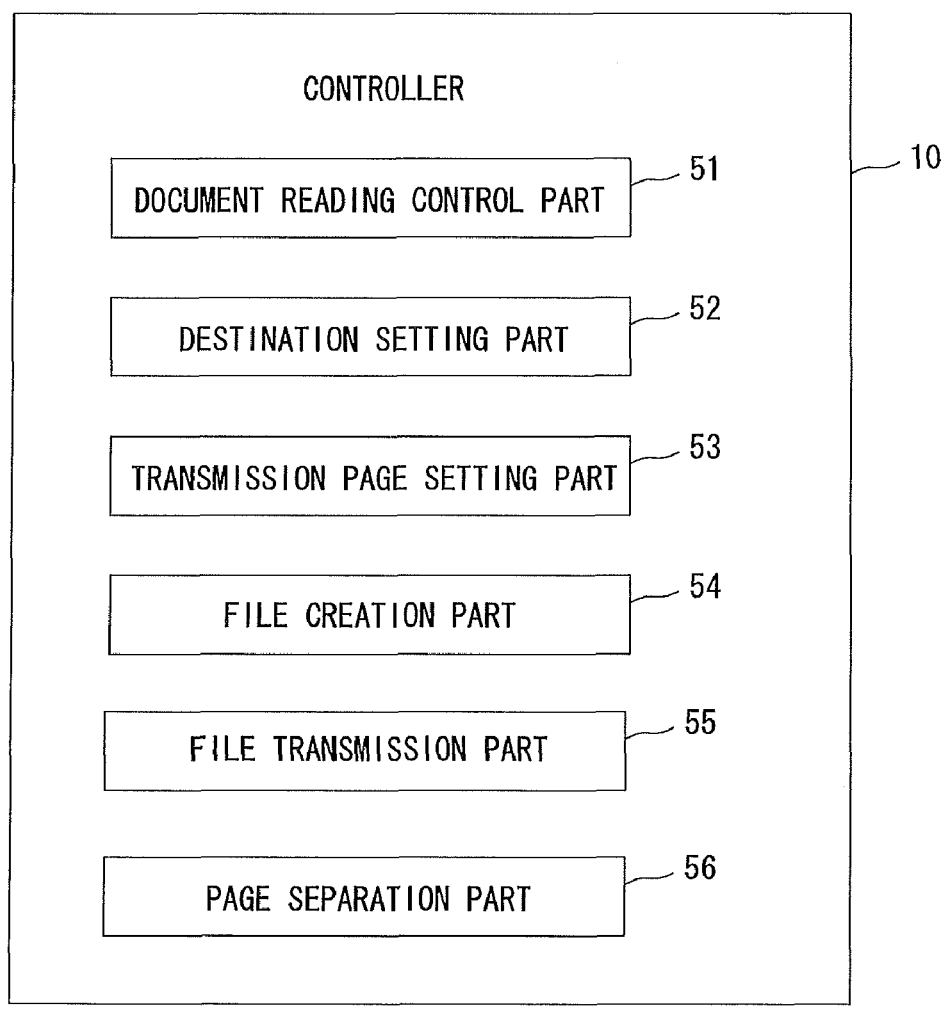
FIG. 12 shows the functional structure of a controller realized by executing a program in a second preferred embodiment of the present invention.

In the second preferred embodiment, the CPU 11 executes the program 14 in the controller 10 so that the controller 10 functions as the document reading control part 51, the targeted destination setting part 52, the transmission page setting part 53, the file creation part 54, the file transmission part 55, and a page separation part 56 as shown in FIG. 12.

The page separation part 56 becomes operative after the scanner unit 2 reads a document with multiple pages and stores the image data of each page into the image memory 41. Then, the page separation part 56 divides separates the image data of the multiple pages into a predetermined number of pages, and creates two or more separation files containing the image data of different pages.

Each of the document reading control part 51 and the destination setting part 52 functions in the same manner as the corresponding one in the first preferred embodiment. As well as the one in the first preferred embodiment, the transmission page setting part 53 selects at least one page addressed to each of a plurality of destinations from multiple pages for which image data stored in the image memory 41 are generated, and sets the selected page as a transmission page addressed to each destination. More specifically, the transmission page setting part 53 of the second preferred embodiment associates at least one separation file selected from two or more separation files created by the page separation part 56 with each of a plurality of destinations, so that a transmission page (more precisely, a separation file) addressed to each of the plurality of destinations is set for each destination. The file creation part 54 creates a transmission file containing the image data of at least one page addressed to each destination based on a transmission page (more precisely, a separation file) addressed to each destination set by the transmission page setting part 53. In the second preferred embodiment, separation files created by the page separation part 56 are employed as they are as transmission files. As well as the one in the first preferred embodiment, the file transmission part 55 individually transmits at least one transmission file addressed to each destination and created by the file creation part 54 to a corresponding destination.

Figure 13:
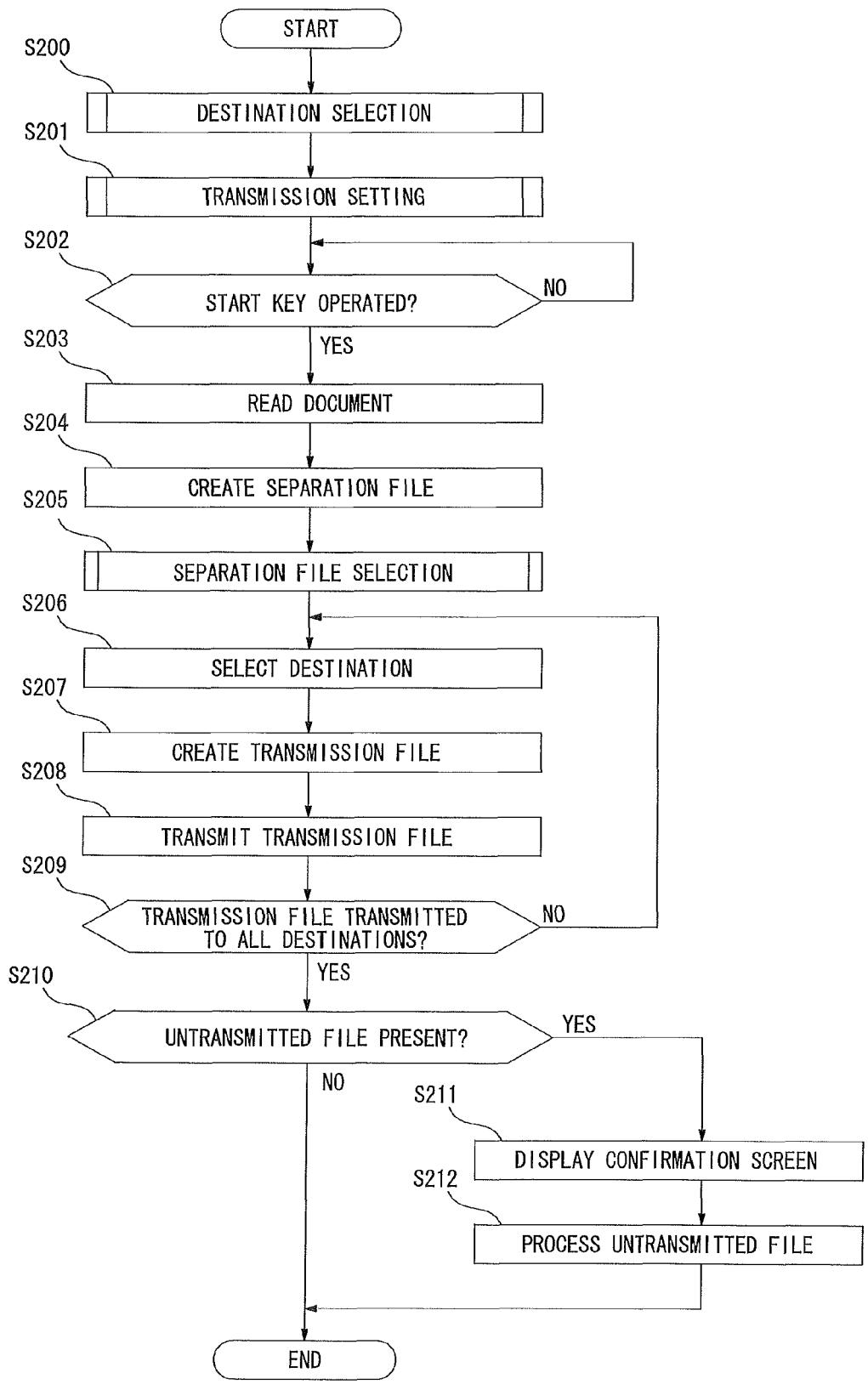
FIG. 13 is a flow diagram for explaining an exemplary process in the second preferred embodiment for an image processing device to read a document with multiple pages, and to transmit transmission files containing the image data of different pages to a plurality of destinations.
Figure 14:
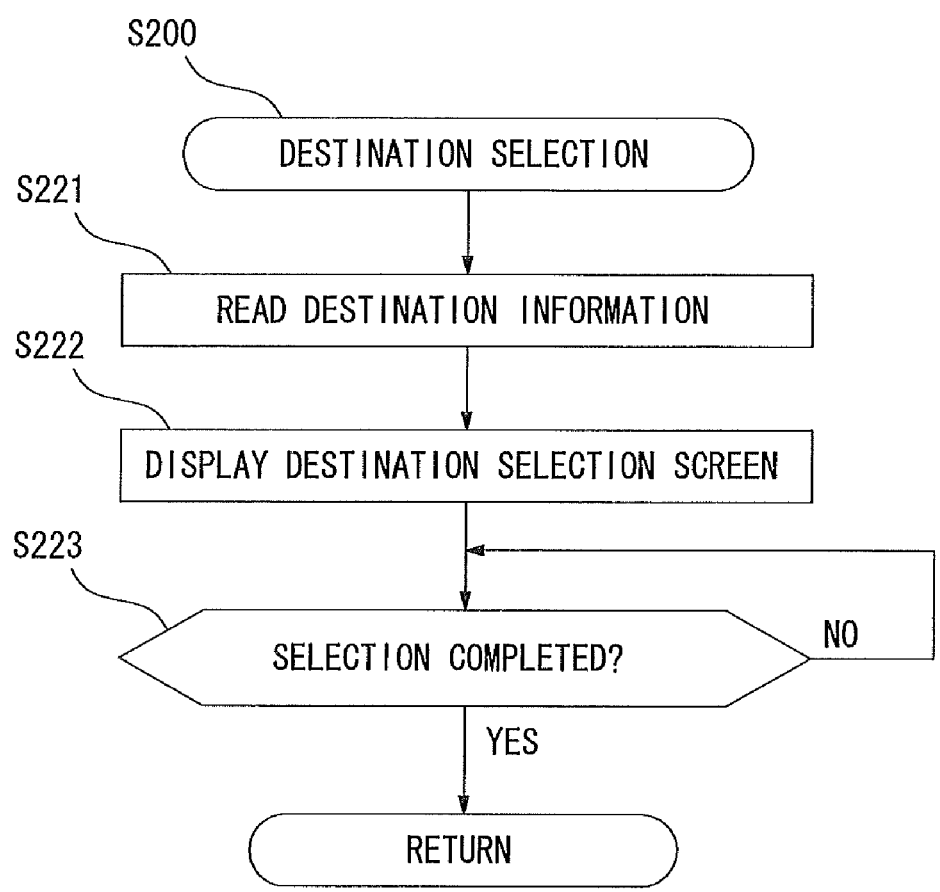
FIG. 14 is a flow diagram for explaining an exemplary detailed process of destination selection referred to in FIG. 13.

FIG. 13 is a flow diagram for explaining an exemplary process in the second preferred embodiment for the image processing device 1 to read a document with multiple pages, and to transmit transmission files containing the image data of different pages to each of a plurality of destinations. This process is performed by the execution of the program 14 by the CPU 11 in the controller 10 of the image processing device 1. When the controller 10 starts the processing, targeted destinations are selected first (step S200). The destination selection process is explained in detail in the flow diagram shown in FIG. 14. In the destination selection process, the controller 10 first becomes operative to function as the destination setting part 52. Then, the destination information 44 is read from the storage unit 43 (step S221), and a destination selection screen is displayed on the image display unit 32 of the operation panel 3 (step S222). A user is allowed to select a plurality of destinations on the destination selection screen, the explanation of the process of which is not given here is as the same as that in the first preferred embodiment (FIG. 8). The controller 10 checks to see whether or not the selection of the plurality of destinations has been completed (step S223). When the selection is completed (when a result of step S223 is YES), the controller 10 stores destination setting information relating to the plurality of destinations selected by the user into the RAM 12.

Figure 15:
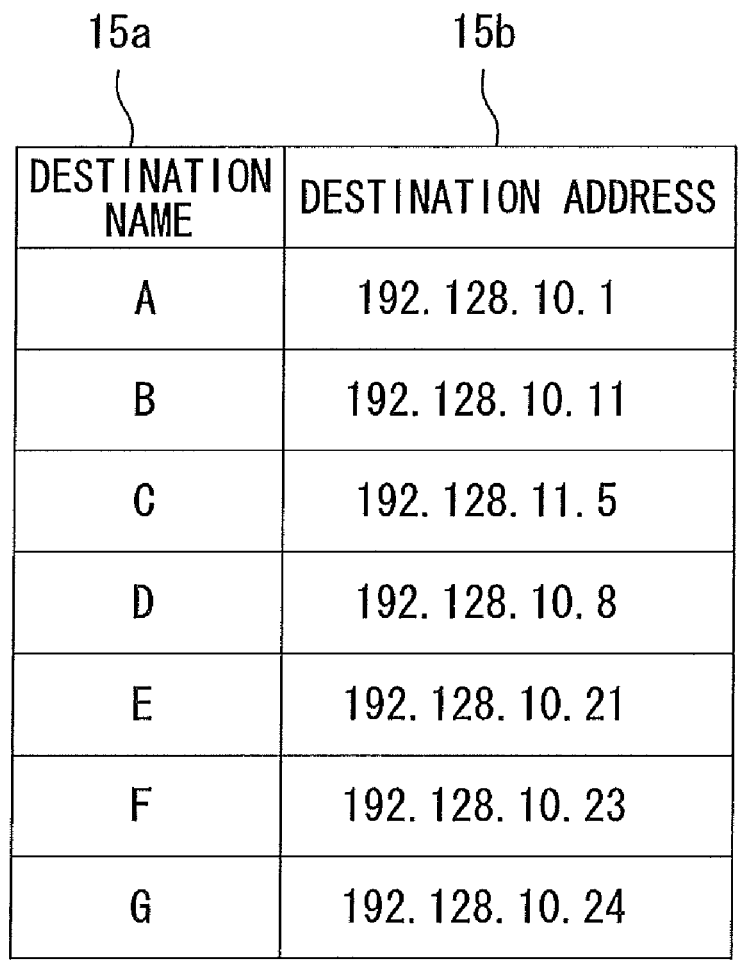
FIG. 15 shows an example of destination setting information stored as a result of the destination selection explained in FIG. 14.

FIG. 15 shows an example of the destination setting information 15 stored in the RAM 12 by the destination selection (step S200) in the second preferred embodiment. The destination setting information 15 of the second preferred embodiment contains a destination name 15*a* and a destination address 15*b* of each destination. Therefore, in the second preferred embodiment, only targeted destinations can be identified by referring to the destination setting information 15, which is different from the first preferred embodiment. The destination selection process of the second preferred embodiment is completed here, and the flow returns to the process shown in the flow diagram of FIG. 13.

Figure 16:
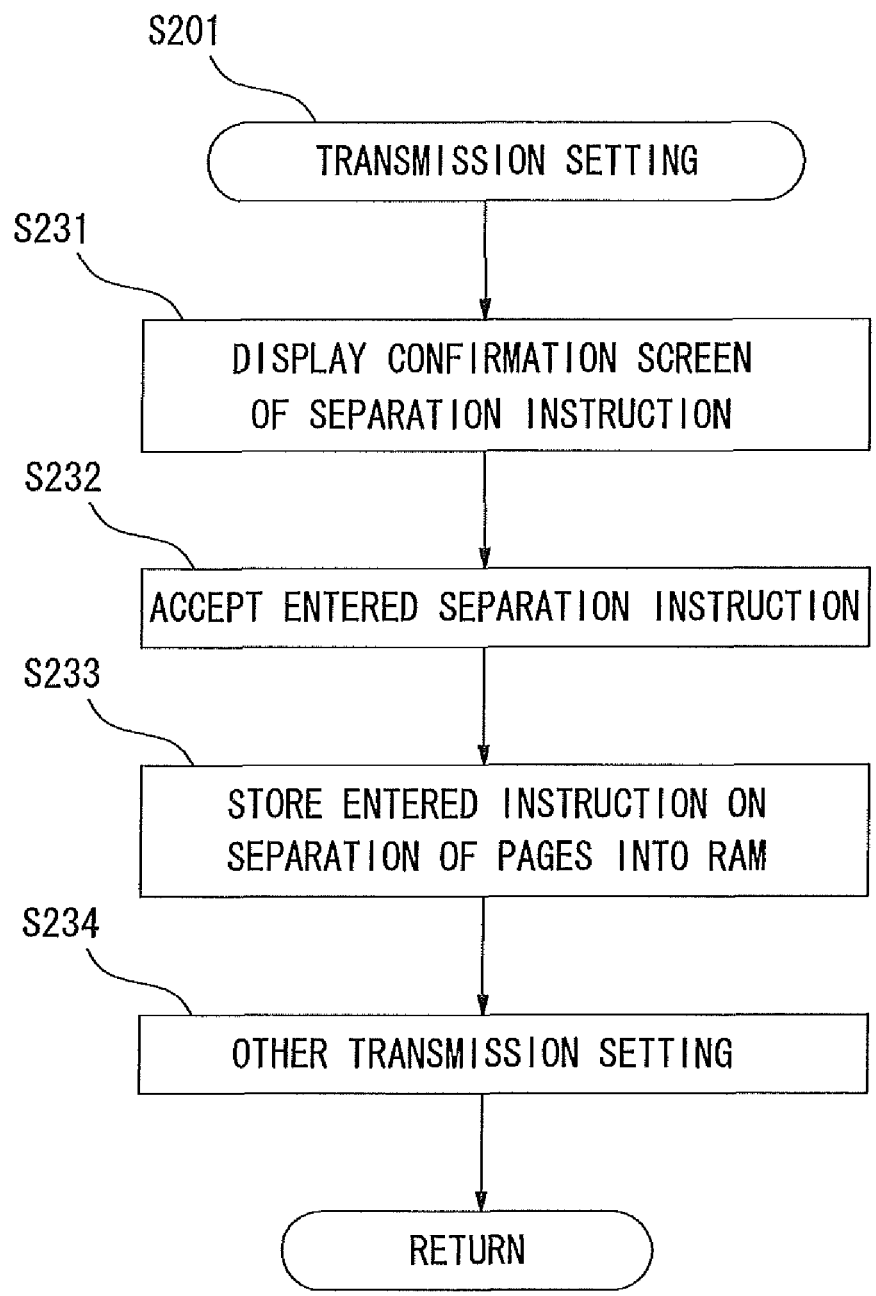
FIG. 16 is a flow diagram for explaining an exemplary detailed process of transmission setting referred to in FIG. 13.

Next, the controller 10 executes a transmission setting process (step S201). The transmission setting process is explained in detail in the flow diagram shown in FIG. 16. The controller 10 displays a confirmation screen of separation instruction on the image display unit 32 of the operation panel 3 to enable an entering operation of the number of pages into which pages are separated for transmission (step S231), thereby accepting the entering operation of a separation instruction (step S232). Here, the number of pages to be entered is a unit of separating image data generated by reading a document has multiple pages into each page. As an example, for separating into 2 pages, "2" is entered. For separating into 10 pages, "10" is entered. After the number of pages as a unit of separation is entered, the controller 10 stores the entered number of pages into the RAM 12 as an instruction on separation of pages (step S233). Then, the controller 10 executes other transmission settings such as setting of a format of a transmission file (step S234), and completes the process. As a result, the number of pages as a unit of separating image data is stored into the RAM 12 in this processing.

Returning to FIG. 13, after the transmission setting (step S201) is completed, the controller 10 is placed in a standby state until the START key 31*n* (see FIG. 9) of the operation panel 3 to be operated (step S202). When the START key 31*n* is operated, the controller 10 reads the document with the multiple pages placed on the scanner unit 3 (step S203). At this time, the controller 10 becomes operative to function as the document reading control part 51 to control the operation of the scanner unit 2. Then, the image data of each page of the document with the multiple pages are stored into the image memory 41 on a page by page basis.

After reading of all the multiple pages of the document is completed, the controller 10 becomes operative to function as the page separation part 56 to create separation files (step S204). In this processing, the image data of the multiple pages are separated into the number of pages as a unit of separation stored in the RAM 12 to create two or more separation files. As an example, it is assumed that an instruction is given to separate a document with 10 pages into 2 pages. In this case, a first separation file is created with the image data of 1st and 2nd pages, a second separation file is created with the image data of 3rd and 4th pages, a third separation file is created with the image data of 5th and 6th pages, a fourth separation file is created with the image data of 7th and 8th pages, and a fifth separation file is created with the image data of 9th and 10th pages. As a result, five separation files in total are created.

Figure 17:
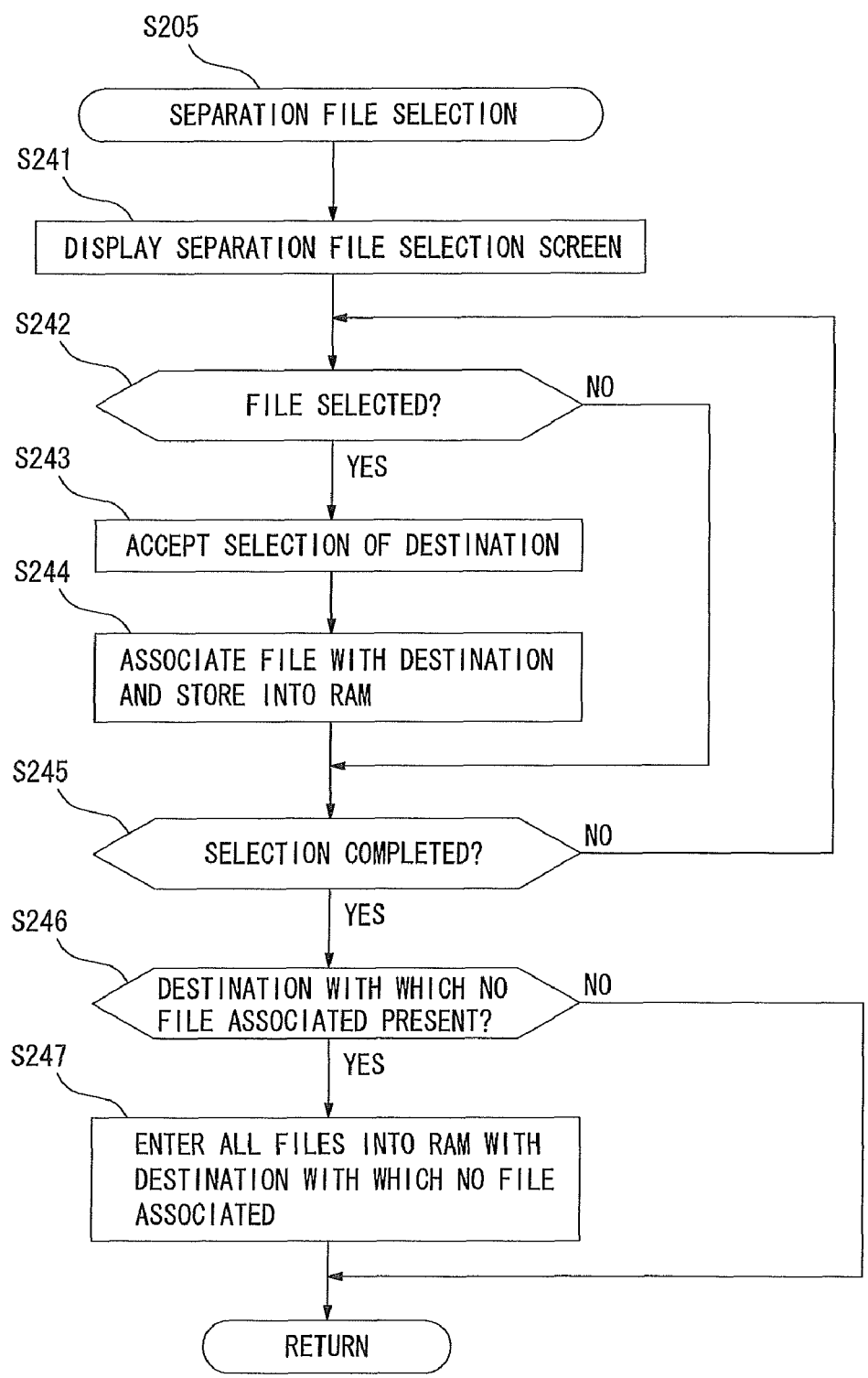
FIG. 17 is a flow diagram for explaining in detail a detailed process of separation file selection referred to in FIG. 13.

After the separation files are created in this way, the controller 10 becomes operative to function as the transmission page setting part 53 to perform a separation file selection (step S205). In this processing, the two or more separation files created by the separation file creation are each associated with a corresponding one of the plurality of destinations. FIG. 17 is a flow diagram for explaining the detailed process of the separation file selection (step S205). The controller 10 displays a separation file selection screen on the image display unit 32 of the operation panel 3 (step S241).

Figure 18:
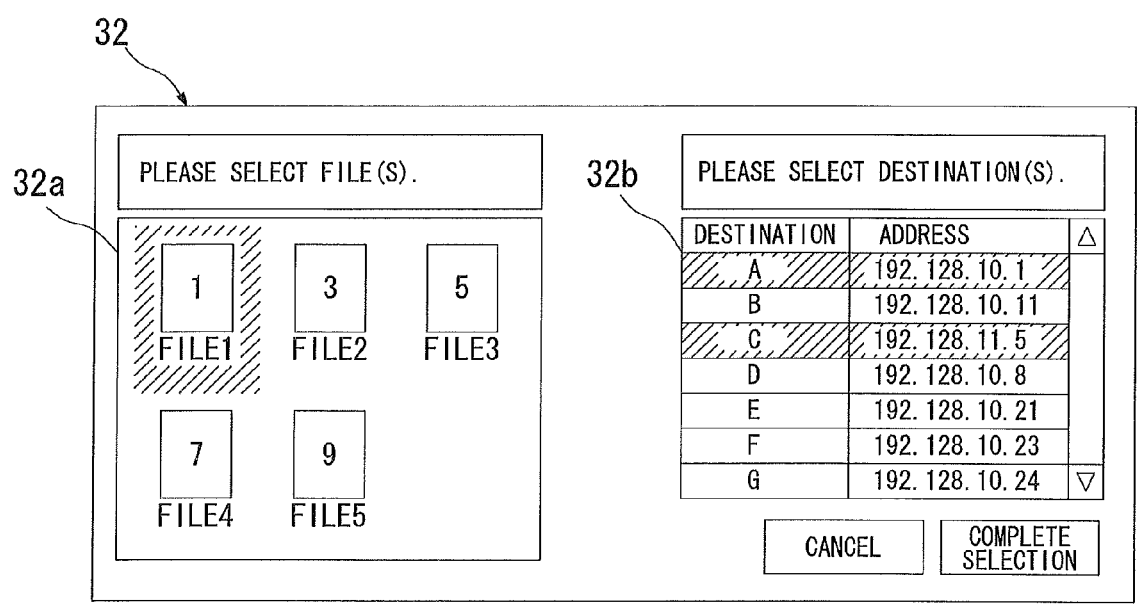
FIG. 18 shows an example of a separation file selection screen.

FIG. 18 shows an example of the separation file selection screen. As shown in FIG. 18, the two or more separation files created by the separation file creation are displayed in list form as the thumbnail images in the left display area of the separation file selection screen. In the right display area of the separation file selection screen, the plurality of destinations selected by the user as targeted destinations are displayed in list form. By selecting a separation file from the two or more separation files displayed in a list 32*a* in the left display area of the separation file selection screen, and by selecting at least one destination from the plurality of destinations displayed in a list 32*b* in the right display area, the selected separation file is able to be associated with the at least one destination to which the selected separation file is addressed. In the example shown in FIG. 18, a "file 1" is selected from the separation files displayed in list form, and two destinations "A" and "C" are selected from the destinations displayed in list form. In this case, the two destinations "A" and "C" are set as to which the "file 1" is addressed.

Returning to FIG. 17, after the separation file selection screen is displayed on the image display unit 32, the controller 10 checks to see whether or not the user selected a separation file (step S242). If the user selected a separation file, the controller 10 accepts the selection operation of a destination from the destinations displayed in list form (step S243). When a selection completion key is operated with selecting at least one destination, the controller 10 additionally stores the separation file selected by the user and the selected destination into the destination setting information 15 stored in the RAM 12 to associate with each other (step S244). Then, the process flow moves on to step S245. Even when an operation other than the separation file selection is performed in step S242, the process flow still moves on to step S245.

Next, the controller 10 checks to see whether or not an instruction to complete the separation file selection was given (step S245). If such an instruction has not been given yet, the process flow returns to step S242 to repeat the operation of associating a separation file with a destination. In contrast, if such an instruction was given, the controller 10 checks to see whether or not the plurality of destinations selected by the user includes a destination with which no separation file has been associated (step S246). If there is a destination with which no separation file has been associated, the controller 10 associates all the separation files with this destination and additionally stores into the destination setting information 15 stored in the RAM 12 (step S247). If it is determined in step S246 that there is not any destination with which no separation file has been associated, the controller 10 completes the processing here.

FIG. 19 shows an example of the destination setting information 15 updated by the separation file selection described above. After the separation file selection (step S205) is performed, a separation file 15e is additionally stored in the destination setting information 15 as shown in FIG. 19 that had only contained the destination name 15a and the destination address 15b at the time of the completion of the destination selection (step S200). In the destination setting information 15 shown in FIG. 19, a separation file to be transmitted is specified for each of the plurality of destinations selected by the user. Each of the separation files contains the image data of a specified page. So, selection of at least one separation file from the two or more separation files, and association of the selected separation file with each of the plurality of destinations in the separation file selection described above is the same meaning as the setting of a transmission page addressed to each of the plurality of destinations.

Returning to FIG. 13, after the separation file selection (step S205) is completed; the controller 10 becomes operative to function as the file creation part 54 and the file transmission part 55. Then, the controller 10 reads the destination setting information 15 stored in the RAM 12, and selects a destination from the plurality of destinations selected by the user (step S206). Next, the controller 10 refers to the separation file 15e corresponding to the selected destination, and specifies at least one separation file associated with the selected destination. The controller 10 thereafter reads the specified separation file from the two or more separation files stored in the image memory 41 to create a transmission file (step S207). If several separation files are associated with the selected destination, the controller 10 reads these separation files, and creates transmission files for each of the separation files.

The controller 10 thereafter transmits the transmission file created in step 207 to the destination selected in step S206 (step S208). Next, the controller 10 determines whether or not the transmission files were transmitted to all of the plurality of destinations registered in the destination setting information 15 (step S209). If there is any destination that has yet to be transmitted a transmission file, the process flow returns to step S206 to repeat the above-described process from step S206 to step S208. When the process of transmitting to all of the destinations is completed, the controller 10 determines whether or not there is any separation file that has yet to be transmitted (step S210). If there is any transmission file that has yet to be transmitted, the controller 10 displays a confirmation screen on the image display unit 32 of the operation panel 3 (step S211), and executes an operation such as deletion of the untransmitted separation file according to the user's manipulation performed on the screen (step S212). Then, the controller 10 completes the process here. If there is no untransmitted transmission file found in step S210, the controller 10 also completes the process here.

Figure 20:
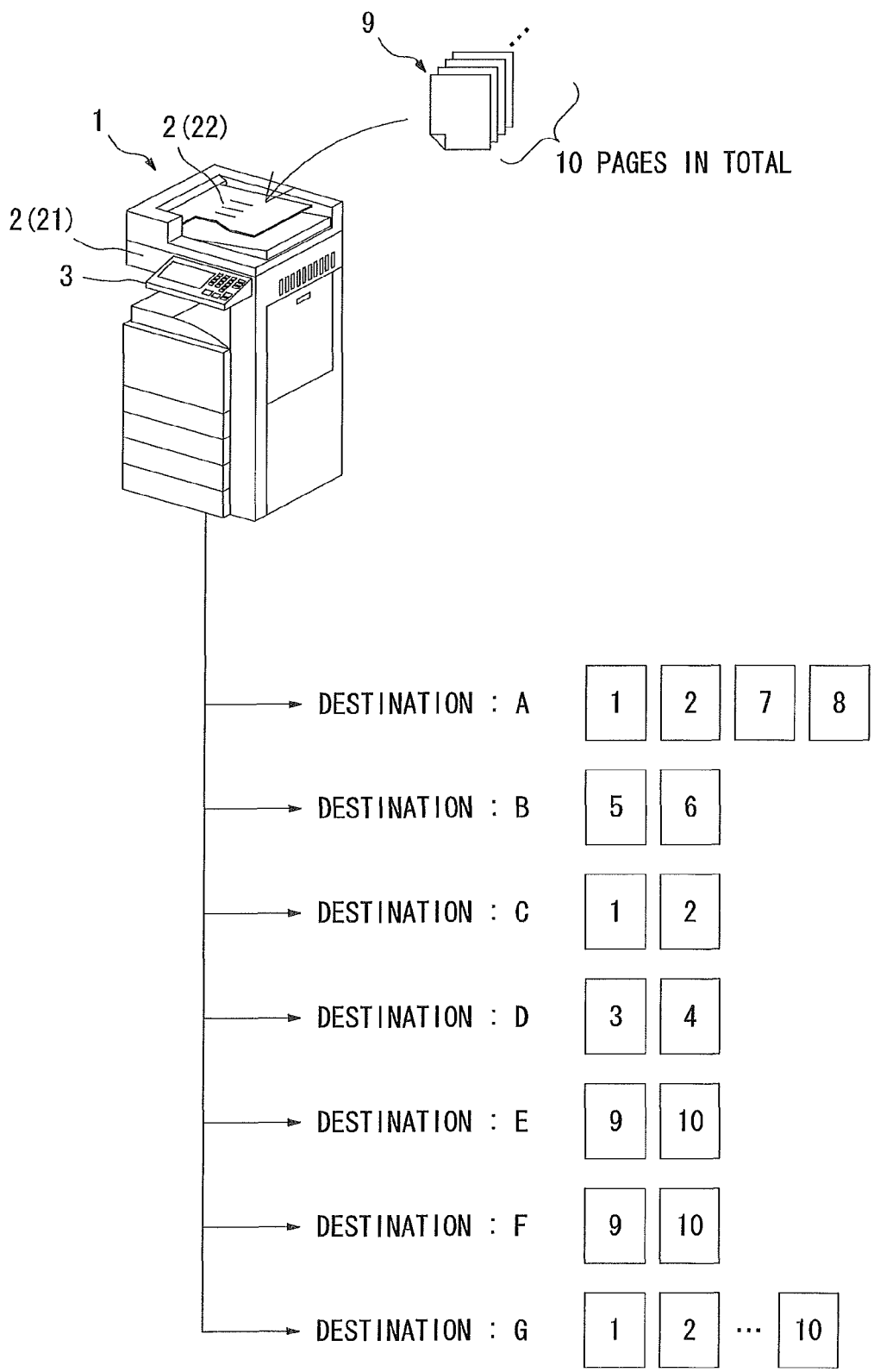
FIG. 20 shows exemplary transmission realized in the image processing device of the second preferred embodiment.

FIG. 20 shows an exemplary transmission realized in the image processing device 1 by performing the process described above. It is assumed that the image processing device 1 reads the document 9 with 10 pages in total at a time, separates the 10 pages into 2 pages, and transmits at least one transmission file to each of the destinations "A", "B", "C", "D", "E", "F" and "G" according to the destination setting information setting 15 shown in FIG. 19. In this case, the image processing device 1 transmits a transmission file containing a transmission page (separation file) specified by a user to each of the destinations "A", "B", "C", "D", "E", "F" and "G". As a result, as shown in FIG. 20, the image data of 1st and 2nd pages included in a separation file 1, and the image data of 7th and 8th pages included in a separation file 4 are transmitted to the destination "A." The image data of 5th and 6th pages included in a separation file 3 are transmitted to the destination "B." The image data of the 1st and 2nd pages included in the separation file 1 are transmitted to the destination "C." The image data of 3rd and 4th pages included in a separation file 2 are transmitted to the destination "D." The image data of 9th and 10th pages included in a separation file 5 are transmitted to each of the destinations "E" and "F." The image data of all the 1st to 10th pages included in all the separation files 1 to 5 are transmitted to the destination "G."

In the example above, it is described a case of separating pages into a fixed number of pages as a unit of separation for creating separation files. However, pages are not necessarily required to be separated into a fixed number of pages. The number of pages as a unit of separation is able to be set for each file to be created. By way of example, where a document has 10 pages in total, a first separation file may include 1st and 2nd pages, a second separation file may include 3rd to 9th pages, and a third separation file may include only a 10th page. This means the number of pages as a unit of separation may be set so that each separation file includes a different page.

In the image processing device 1 of the second preferred embodiment, the number of pages as a unit of separation is predetermined, so that the image processing device 1 executes a page separation of the image data of multiple pages when the image processing device 1 reads the document 9 with multiple pages all at once, thereby creating two or more separation files containing the image data of different pages. Therefore, at least one separation file selected from the two or more separation files is associated with each of a plurality of destinations, so that a transmission page addressed to each of the plurality of destinations is set for each destination. Namely, also in the second preferred embodiment, a transmission page addressed to each of a plurality of destinations is able to be changed for each destination.

The image processing device 1 of the second preferred embodiment is suitably applied to a case where there are several types of sheet books, and a person in charge differs according to the type of a sheet book, for example. In this case, the number of sheets of each sheet book is specified as the number of pages as a unit of separation, the several types of sheet books are read at a time, persons in charge of the corresponding sheet books are designated as destinations thereafter, and the sheet books are transmitted to the designated persons. That is, the image processing device 1 of the second preferred embodiment is not necessary to execute a document reading operation separately for each of a plurality of destinations to which different pages are required to be transmitted, thereby improving operability in distributing different pages to the plurality of destinations.

(Modifications)

While the preferred embodiments of the present invention have been described above, the present invention is not limited to that described above. Various modifications may be applied to the present invention. In the foregoing description, a case of reading a document with multiple pages and executing scanning transmission to a plurality of destinations are mainly exemplified. However, the present invention is not limited to scanning transmission, but may also be applied to facsimile transmission.

The transmission described in each of the first and second embodiments may be realized in one image processing device 1. Namely, an image processing device may be such a device that selects either the transmission of the first or second preferred embodiment described above when the image processing device reads a document with multiple pages and transmits the document to a plurality of destinations.

While the invention has been shown and described in detail, the foregoing description is in all aspects illustrative and not restrictive. It is therefore understood that numerous modifications and variations can be devised without departing from the scope of the invention.

What is claimed is:

1. An image processing device, comprising:
    a document reading part for reading a document with multiple pages and for generating image data of each page;
    a destination setting part for setting a plurality of destinations to which said image data generated by said document reading part are to be transmitted;
    a transmission page setting part for selecting, for each of said plurality of destinations, at least one page to be transmitted to said destination from said multiple pages for which said image data are generated by said document reading part, and for setting, for each of said plurality of destinations, the selected at least one page as a transmission page to be transmitted to said destination;
    a file creation part for creating, for each of said plurality of destinations, a respective transmission file containing the image data of the selected at least one page to be transmitted to said destination based on said transmission page set for said destination by said transmission page setting part; and
    a file transmission part for individually transmitting each said respective transmission file created by said file creation part to each respective destination.

2. The image processing device according to claim 1, wherein
    before said file transmission part performs transmission to each destination, said file creation part extracts the image data of at least one page to be transmitted to each destination from said image data of said multiple pages generated by said document reading part to create said transmission file.

3. The image processing device according to claim 2, wherein
    said transmission page setting part sets each said transmission page to be transmitted to each destination before said document reading part starts to read said document with said multiple pages.

4. The image processing device according to claim 1, further comprising:
    a page separation part for separating said multiple pages for which said image data are generated by said document reading part into a predetermined number of pages to create two or more files containing the image data of different pages, wherein
    said transmission page setting part associates at least one file selected from said two or more files created by said page separation part with each of said plurality of destinations to set each said transmission page to be transmitted to each of said plurality of destinations.

5. The image processing device according to claim 4, wherein
    said file creation part creates each said respective transmission file to be transmitted to each respective destination based on said at least one file associated with each of said plurality of destinations.

6. The image processing device according to claim 1, wherein the file creation part creates, for a particular one of the plurality of destinations, a particular transmission file containing image data of multiple pages of the document, and the file transmission part transmits the particular transmission file containing image data of multiple pages of the document to the particular one of the plurality of destinations.

7. An image processing method, comprising the step of:
    (a) reading a document with multiple pages and generating image data of each page;
    (b) setting a plurality of destinations to which said image data generated in said step (a) are to be transmitted;
    (c) selecting, for each of said plurality of destinations, at least one page to be transmitted to said destination from said multiple pages for which said image data are generated in said step (a), and setting, for each of said plurality of destinations, the selected at least one page as a transmission page to be transmitted to said destination;
    (d) creating, for each of said plurality of destinations, a respective transmission file containing the image data of the selected at least one page to be transmitted to said destination based on said transmission page set for said destination in said step (c); and
    (e) individually transmitting each said respective transmission file created in said step (d) to each respective destination.

8. The image processing method according to claim 7, wherein
    before transmission to each destination is performed in said step (e), the image data of at least one page to be transmitted to each destination is extracted from said image data of said multiple pages generated in said step (a) to create said transmission file in said step (d).

9. The image processing method according to claim 8, wherein
    said transmission page to be transmitted to each destination is set in said step (c) before said document with said multiple pages is started to be read in said step (a).

10. The image processing method according to claim 7, further comprising the step of:
    (f) separating said multiple pages for which said image data are generated in said step (a) into a predetermined number of pages to create two or more files containing the image data of different pages, wherein
    in said step (c), at least one file selected from said two or more files created in said step (f) is associated with each of said plurality of destinations to set each said transmission page to be transmitted to each of said plurality of destinations.

11. The image processing method according to claim 10, wherein
    each said respective transmission file to be transmitted to each respective destination is created based on said at least one file associated with each of said plurality of destinations in said step (d).

12. The image processing method according to claim 7, wherein the step (d) comprises creating, for a particular one of the plurality of destinations, a particular transmission file containing image data of multiple pages of the document, and the step (e) comprises transmitting the particular transmission file containing image data of multiple pages of the document to the particular one of the plurality of destinations.

13. A program stored on a non-transitory computer readable medium and executed by a computer of an image processing device, said program causing said computer to execute processing comprising the steps of:
  (a) reading a document with multiple pages and generating image data of each page;
  (b) setting a plurality of destinations to which said image data generated in said step (a) are to be transmitted;
  (c) selecting, for each of said plurality of destinations, at least one page to be transmitted to said destination from said multiple pages for which said image data are generated in said step (a), and setting, for each of said plurality of destinations, the at least one selected page as a transmission page to be transmitted to said destination;
  (d) creating, for each of said plurality of destinations, a respective transmission file containing the image data of the selected at least one page to be transmitted to said destination based on said transmission page set for said destination in said step (c); and
  (e) individually transmitting each said respective transmission file created in said step (d) to each respective destination.

14. The program according to claim 13, wherein
before transmission to each destination is performed in said step (e), the image data of at least one page to be transmitted to each destination is extracted from said image data of said multiple pages generated in said step (a) to create said transmission file in said step (d).

15. The program according to claim 14, wherein
said transmission page to be transmitted to each destination is set in said step (c) before said document with said multiple pages is started to be read in said step (a).

16. The program according to claim 13, further comprising the step of:
  (f) separating said multiple pages for which said image data are generated in said step (a) into a predetermined number of pages to create two or more files containing the image data of different pages, wherein
  in said step (c), at least one file selected from said two or more files created in said step (f) is associated with each of said plurality of destinations to set each said transmission page to be transmitted to each of said plurality of destinations.

17. The program according to claim 16, wherein
each said respective transmission file to be transmitted to each respective destination is created based on said at least one file associated with each of said plurality of destinations in said step (d).

18. The program according to claim 13, wherein the step (d) comprises creating, for a particular one of the plurality of destinations, a particular transmission file containing image data of multiple pages of the document, and the step (e) comprises transmitting the particular transmission file containing image data of multiple pages of the document to the particular one of the plurality of destinations.

* * * * *